United States Patent [19]
Etgen

[11] Patent Number: 6,049,759
[45] Date of Patent: Apr. 11, 2000

[54] METHOD OF PRESTACK 3-D MIGRATION

[75] Inventor: John T. Etgen, Tulsa, Okla.

[73] Assignee: BP Amoco Corporation, Chicago, Ill.

[21] Appl. No.: 09/007,977

[22] Filed: Jan. 16, 1998

[51] Int. Cl.[7] .................................................... G06F 19/00
[52] U.S. Cl. .............................................................. 702/14
[58] Field of Search ................................... 702/14, 16, 17, 702/18; 367/72, 73

[56] References Cited

U.S. PATENT DOCUMENTS

| | | | |
|---|---|---|---|
| H000482 | 6/1988 | Berryhill et al. | 367/38 |
| 4,888,742 | 12/1989 | Beasley . | |
| 4,964,097 | 10/1990 | Wang et al. . | |
| 5,067,113 | 11/1991 | Hanson et al. . | |
| 5,243,563 | 9/1993 | Kim . | |
| 5,392,255 | 2/1995 | LeBras et al. | 367/50 |
| 5,500,832 | 3/1996 | Berryhill | 367/51 |
| 5,586,026 | 12/1996 | Highnam et al. | 364/421 |

FOREIGN PATENT DOCUMENTS

| | | |
|---|---|---|
| 0430688 | 11/1990 | European Pat. Off. . |
| WO9700485 | 1/1997 | WIPO . |

OTHER PUBLICATIONS

R. H. Stolt—"Migration By Fourier Transform", Geophysics. vol. 43, No. 1 (Feb. 1978) pp. 23–48—26 FIGS.

Norman Bleistein—"On the imaging of reflectors in the earth", Geophysics, vol. 52, No. 7 (Jul. 1987); pp. 931–942—1 FIG.

Christian Hanitzsch—"Comparison of weights in prestack amplutude–preserving Kirchhoff depth migration" Geophysics, vol. 62, No. 6 (Nov.–Dec. 1997); pp. 1812–1816.

William A. Schneider—"Integral Formulation for Migration In Two And Three Dimensions", Geophysics, vol. 43, No. 1 (Feb. 1978), pp. 49–76. 37 FIGS.

Bleistein, On The Imaging Of Reflectors In The Earth, vol. 52, No. 7, pp. 931–942, *Geophysics*, Jul. 1987.

Biondi & Palacharla, 3–D Prestack Migration Of Common–Azimuth Data, vol. 61, No. 6, pp. 1822–1832, *Geophysics*, Nov.–Dec., 1996.

Biondi & Chemingui, Transformation Of 3–D Prestack Data By Azimuth Moveout (AMO), 64th Ann. Internat. Mtg. Soc. Expl. Geophys., Expanded Abstracts, pp. 1541–1544, 1994.

(List continued on next page.)

*Primary Examiner*—Donald E. McElheny, Jr.
*Attorney, Agent, or Firm*—James A. Gabala; Robert E. Sloat

[57] ABSTRACT

The present invention relates generally to a method for migrating prestack seismic data that can yield enormous gains in computational efficiency for some classes of seismic velocity models. The method disclosed herein provides an method of rapidly calculating a 2-D or 3-D prestack migration of common offset seismic data volumes for horizontally layered velocity models. Additionally, because of the way that the migration is implemented, it is possible to calculate the migration operator using a very accurate wave transmission model with little increase in overall computer run time, i.e., a "full fidelity" migration. Broadly speaking, the instant invention is founded on the following novel observation: when the underlying velocity model consists of horizontally layered constant-velocity media, the prestack migration of a collection of common offset traces can be written as a convolution of a migration operator with the seismic data. As such, the migration may be sped up enormously by transforming both the migration operator and the seismic data to another domain where the convolution between the two can be calculated very efficiently. The invention disclosed herein will be most fully appreciated by those in the seismic interpretation and seismic processing arts.

75 Claims, 13 Drawing Sheets

OTHER PUBLICATIONS

Johnson & French, Migration—The Inverse Method, Chapter 5, pp. 115–157, *Concepts and Techniques in Oil and Gas Exploration*, Jain and deFigueiredo (eds), Society of Exploration Geophysicists, 1982.

Nichols, Imaging Complex Structures Using Band Limited Green's Functions, pp. 1–114, Stanford Exploration Project No. 81, 1994.

Yilmaz, Seismic Data Processing, Chapters 4 and 5, pp. 240–383, Chapter 6, pp. 384–427, Appendix C, pp. 507–518; Doherty (ed.), Society of Exploration Geophysicists, 1987.

Xu, 3–D Common Offset Inversion In Depth Dependent Media And Its Parallel Implementation, pp. i–39, CWP–228, Center for Wave Phenomena, Colorado School of Mines, Aug. 1996.

Keho & Beydoun, Paraxial Ray Kirchhoff Migration, vol. 53, No. 12, pp. 1540–1546, *Geophysics*, Dec., 1988.

Encyclopedic Dictionary Of Exploration Geophysics, Second Edition, Sheriff (ed.), Society of Exploration Geophysicists, 1984, pp. 8–9.

METHOD OF PRESTACK 3-D MIGRATION

FIELD OF THE INVENTION

The present invention relates generally to the field of seismic exploration and, in more particular, to methods of migrating 2-D and 3-D seismic data before stack. It additionally relates to the use of seismic data to detect subsurface features that are conducive to the migration, accumulation, or presence of hydrocarbons. The invention disclosed herein will be most fully appreciated by those in the seismic interpretation and seismic processing arts, and by the those who develop migration computer software for use in interpretation and processing.

BACKGROUND

A seismic survey represents an attempt to map the subsurface of the earth by sending sound energy down into the ground and recording the "echoes" that return from the rock layers below. The source of the down-going sound energy might come, for example, from explosions or seismic vibrators on land, and air guns in marine environments. During a seismic survey, the energy source is moved across the surface of the earth above a geologic structure of interest. Each time the source is detonated, it generates a seismic signal that travels downward through the earth, is reflected, and, upon its return, is recorded at a great many locations on the surface. Multiple explosion/recording combinations are then combined to create a near continuous profile of the subsurface that can extend for many miles. In a two-dimensional (2-D) seismic survey, the recording locations are generally laid out along a single straight line, whereas in a three-dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area.

A seismic survey is composed of a very large number of individual seismic recordings or traces. In a typical 2-D survey, there will usually be several tens of thousands of traces, whereas in a 3-D survey the number of individual traces may run into the multiple millions of traces. General background information pertaining to 3-D data acquisition and processing may be found in Chapter 6, pages 384–427, of *Seismic Data Processing* by Ozdogan Yilmaz, Society of Exploration Geophysicists, 1987, the disclosure of which is incorporated herein by reference.

A modem seismic trace is a digital recording (analog recordings were used in the past) of the acoustic energy reflecting back from inhomogeneities in the subsurface, a partial reflection occurring each time there is a change in the acoustic impedance of the subsurface materials. The digital samples are usually acquired at 0.004 second (4 millisecond or "ms") intervals, although 2 millisecond and 1 millisecond sampling intervals are also common. Thus, each digital sample in a seismic trace is associated with a travel time, and in the case of reflected energy, a two-way travel time from the surface to the reflector and back to the surface again. Further, the surface location of every trace in a seismic survey is carefully recorded and is generally made a part of the trace itself (as part of the trace header information). This allows the seismic information contained within the traces to be later correlated with specific subsurface locations, thereby providing a means for posting and contouring seismic data—and attributes extracted therefrom—on a map (i.e., "mapping").

The data in a 3-D survey are amenable to viewing in a number of different ways. First, horizontal "constant time slices" may be taken extracted from a stacked or unstacked seismic volume by collecting all digital samples that occur at the same travel time. This operation results in a 2-D plane of seismic data. By animating a series of 2-D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2-D seismic line from within the 3-D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface velocity are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets. In brief, seismic data provides some of the best subsurface structural and stratigraphic information that is available, short of drilling a well.

That being said, unprocessed seismic data is only of limited use to an explorationist. Seismic data as it is acquired in the field is seldom used directly, but instead it is first returned to a processing center where various mathematical algorithms are applied to the digital seismic data to enhance its signal content and generally make it more amenable to interpretation. A key step in a typical seismic processing sequence is seismic migration, or inversion as it is also characterized.

As is well known to those skilled in the art, the dip and location of a reflector on an unmigrated seismic section is rarely representative of the true dip and subsurface location of the structural or stratigraphic feature that gave rise to that reflector. Except in the case where the subsurface consists of homogenous nearly-horizontal layers, the recorded seismic expression of a structural or stratigraphic event must be migrated before it can be reliably used to locate subsurface features of interest. In areas of steep dip, a reflection that is apparently located directly below a particular shot point may actually be found several hundreds of feet laterally away from that shot point. Additionally, in complex structural areas where faulting, severe asymmetrical folding and sharp synclines are present, diffractions and multiple reflections may interfere with reflections from the primary reflectors to the point where the resulting seismic section bears little or no resemblance to the actual subsurface structure.

Broadly speaking, migration improves a seismic section or volume by "focusing" the seismic data contained therein, a process that is conceptually similar to that of "focusing" the image produced by a slide projector in order to obtain the sharpest screen image. Migration improves the seismic image by correcting the lateral mispositioning of dipping seismic reflectors; collapsing diffractions caused by point scattering centers and subsurface fault terminations; resolving crossing reflectors (conflicting dips); and improving the vertical and lateral resolution of the seismic data, among many others. A general description of the many ways that migration improves seismic data may be found in, for example, Chapters 4 and 5, and Appendix C, pages 240–383, and 507–518, of *Seismic Data Processing* by Ozdogan Yilmaz, Society of Exploration Geophysicists, 1987, the disclosure of which is incorporated herein by reference. As a general rule, seismic data that have been properly migrated reveal an enhanced or a truer picture of the subsurface than unmigrated seismic data, the ultimate goal of seismic migration being to produce a seismic section or volume that accurately represents the configuration of the geology of the subsurface.

There are two broad variants of seismic migration: migration after stack (post-stack) and migration before stack (prestack). Post-stack migration is applied, as the name suggests, to seismic traces after they have been stacked—a stacked seismic trace being one that is formed by combining together two or more traces to form a single composite trace. Prestack migration, on the other hand, is applied to seismic traces before they have been stacked. Other things being equal prestack migration is always preferred—both theoretically and in practice—because it has the potential to produce a more accurate picture of the subsurface stratigraphy and structure. However, the computational effort involved in computing a prestack migration is many times that required to do a post-stack migration. For 2-D seismic lines, this additional computational effort is generally manageable, and, except for the longest lines, prestack migration is often applied to seismic data that has been taken in areas where the subsurface structure is complicated. Most 3-D data sets, on the other hand, contain far too many traces to be migrated via conventional prestack algorithms.

A further division of seismic migration algorithms may be made based on whether the migration takes place in "depth" or "time." Broadly speaking, the operational difference between the two approaches is that a trace in the seismic volume that results from a depth migration contains digital samples that are separated by units of depth, rather than time. In more particular, whereas a seismic trace in a conventional seismic survey has samples that are spaced some distance $\Delta t$ apart in time (where, for example, $\Delta t$ might be 4 ms), successive samples in a depth migrated volume are spaced some depth, say $\Delta z$, units apart. Prestack and post-stack migrations may be performed either in time or in depth. Finally, it is well known to those skilled in the art that seismic data that have been migrated in depth may be easily transformed into a conventional "time" section and vise versa.

It is necessary to define a velocity model before a seismic migration can be performed. A velocity model is just a specification of the subsurface velocity structure as a function of depth for subsurface points located in the vicinity of the survey. The velocity model might be simple (involving only a few layers) or complex, but it has always been the conventional wisdom that the best velocity model is the one that most accurately represents the actual configuration of the rock units in the subsurface. In fact, the modern trend has been to move toward increasingly accurate velocity models in an effort to improve the final migrated product. However, it is also well known that useful—even if not completely accurate—results may be obtained when the velocity model is just a gross approximation to the actual subsurface velocity field. In fact, even migrations that use a "layer cake" or horizontally layered velocity model can yield useful results in many circumstances.

The most popular methods of migration in use today are all based ultimately on a solution to the wave equation. As is well known to those skilled in the art, the wave equation is a second order differential equation that describes seismic wave propagation in the subsurface. To the extent that this equation accurately represents seismic wave propagation in the subsurface—and to the extent that the true subsurface velocity and other rock parameters are correctly specified—this equation can be used migrate seismic data with considerable accuracy, a solution to the wave equation producing the theoretically correct way to migrate seismic data. Of course, for most media the wave equation cannot be solved exactly, thus some degree of approximation must be introduced into the solution. As a general rule, the better/more precise the approximation is to the true solution, the better the resulting migration. As might be expected though, the more accurate the approximation the greater the amount of computer time required to perform the migration. The most accurate migration methods are those that take into account—and recover—amplitude variations due to spreading, angle dependent reflections, attenuation, etc. Of course, implementing a migration algorithm that accounts for these sorts of transmission effects requires additional computer time beyond that normally required to migrate a seismic section. Thus, the most desirable migrations are those that use the highest fidelity wave transmission model, the disadvantage of this sort of models being that the computer time necessary to calculate a migration is lengthened accordingly.

The most common approaches to wave equation (based) migration are finite-difference methods, frequency domain (f-k) approaches, and Kirchhoff integral migration. Each of these methods has its advantages and disadvantages, one discussion of the various tradeoffs being found in *Migration—The Inverse Method*, by J. D. Johnson and W. S. French, which is published as chapter 5 (pages 115–157) of CONCEPTS AND TECHNIQUES IN OIL AND GAS EXPLORATION, Jain and de Figueiredo editors, Society of Exploration Geophysicists, 1982, the disclosure of which is incorporated by reference.

Seismic migration is a computationally intensive process, even for simple velocity models. In the case of 2-D data, modern computer speeds (coupled in some cases with the use of parallel and massively parallel processors) have made post-stack migration a routine processing step for most seismic lines, and prestack migration, although correspondingly more costly computation-wise, is also done rather routinely. However, the computational costs associated with a full prestack migration of 3-D seismic data are so enormous that it is seldom performed, despite the fact that many surveys would profit from its use. By way of example, a 3-D survey might consist of one million or more CMPs (e.g., a grid of 1024 CMPs by 1024 CMPs), each of which might be 40 to 60 fold. Thus, as many as 40 to 60 million unstacked seismic traces might be collected in a typical 3-D survey. Although prestack depth migration at "full fidelity" is the preferred approach, the computations involved in such a 3-D prestack migration might require six months or even more to complete at current computer speeds, thereby making it impractical for all but the most important seismic surveys. As a consequence, even a large seismic processing center might be unable to complete more than two or three 3-D prestack migrations a year, even if the computers are utilized at full capacity. This is in spite of the fact that 3-D data can potentially profit the most from prestack migration.

Heretofore, as is well known in the seismic processing and seismic interpretation arts, there has been a need for a method of prestack migration that is highly efficient. Additionally, the method should provide for a highly accurate migration at minimal additional computational cost. Accordingly, it should now be recognized, as was recognized by the present inventors, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The present inventor has discovered a novel means of migrating prestack seismic data that can yield enormous gains in computational efficiency for some classes of seismic velocity models. Additionally, because of the way that the migration is implemented, it is possible to calculate the migration operator using a very accurate wave transmission model with little increase in overall computer run time, i.e., a full fidelity migration. As a preface to the disclosure that follows, note that the instant invention will be discussed in terms of its application to a 3-D prestack seismic data set, although those skilled in the art understand that the same techniques disclosed herein could also be applied with advantage to 2-D prestack seismic data or to post-stack seismic data.

Broadly speaking, a first embodiment of the instant invention is founded on the following novel observation: when the underlying 3-D velocity model consists of horizontally layered constant-velocity media (i.e., a so-called V(z) velocity model), the prestack migration of a collection of common offset traces can be written as a convolution of a migration operator with the seismic data. As such, the migration may be sped up enormously by transforming both the migration operator and the seismic data to another domain where the convolution between the two can be calculated more efficiently. A preferred transformation which may be used for this purpose is the Fourier transform, however those skilled in the art will understand that other transformations could certainly be used to speed this computation and this fact has been contemplated by the inventor. Whatever transformation is used, the migration is preferably implemented as a "depth" migration, but it is also possible to formulate it so as to produce a "time" migration.

Operationally, as an initial step a V(z) velocity model must be specified, a V(z) model being one wherein the model does not vary with respect to the "X" or "Y" (horizontal) coordinates. It is critical to this instant embodiment that this model be horizontally layered if the migration result is to be exact. However there can be as many individual parallel layers as are desired, each layer extending the full width and breadth of the model and each layer characterized by a single velocity value.

In the preferred embodiment, two Green's function arrays are next computed from the information contained within the velocity model. The two arrays contain numerical values representing, respectively, the theoretical travel times and resulting amplitudes of a wave front that originates as a point source on the surface and is measured remotely at various radial distances and depths within the specified velocity model. For isotropic media, the Green's function arrays are indexed as functions of radial surface distance from the point source and depth beneath the surface: they are 2-D arrays. When the media is anisotropic with respect to any of the parameters governing travel times or amplitudes, the Green's function arrays will be three dimensional and will be indexed by depth and an "X" and "Y" surface coordinate. In the text that follows, 2-D Green's function arrays will be discussed almost exclusively, but those skilled in the art will recognize that it would be straightforward to modify the methods disclosed below to accommodate a 3-D Green's function array and, hence, certain types of anisotropy. The Green's function arrays need be calculated only once for this entire migration, because the velocity model is constrained to be horizontally layered.

The Green's function arrays are used in the calculation of the migration operator that implements the actual migration, the migration operator for a single frequency forming a 3-D matrix of the same dimensions as the output migrated seismic volume. In more particular, there is one migration operator "slice" for each depth step in the output migrated seismic data volume and the horizontal ("X" and "Y," or in-line and cross-line) dimensions of the operator arrays must match the horizontal dimensions of the input (and output) seismic data volume. The exact number of horizontal depth slices within a migration operator volume and their separation, $\Delta z$, may be specified by the user of the algorithm. The choice of a particular migration approach (e.g., Kirchhoff migration, finite difference migration, an F-K algorithm, a finite element algorithm, or a reflectivity algorithm) determines the equations that are used to calculate the values within the operator volume. Precisely how to calculate these values will be illustrated below for a Kirchhoff migration, although those skilled in the art will understand how other migration schemes could be utilized instead. Finally, each depth slice in each of the migration operator volumes is separately transformed via a 2-D Fourier transform, thereby producing a volume that has units of "depth" as its vertical axis and units of wavenumber ($k_X$ and $k_Y$) as its horizontal units.

The next step involves applying the migration operator to a common offset seismic data volume, which application is done by way of a computer program designed to implement the instant method. The input seismic data will preferably have been pre-sorted into common offset volumes (or common offset lines or sections if the migration is to be applied to 2-D data) before being made available to the computer program. This sorting will, in effect, produce as many common offset "volumes" of traces as there are different offsets in the survey. As is well know to those skilled in the art, sorting a seismic volume need not involve actual rearrangement of the seismic traces in that volume, but may instead only require changing various pointers that index the data volume. Each sorted common offset volume will be separately migrated.

Next, a discrete 3-D Fourier transform of the common offset data volume is calculated, a 3-D transform being one that is calculated in the time (or vertical) direction and in the X and Y (horizontal) directions. This results in a new data volume containing transform coefficients that have been reorganized into vertical units of frequency ($\omega$) and horizonal units of wavenumber, i.e., $k_x$ and $k_y$. Thus, each horizontal slice from this volume contains the Fourier transform coefficients corresponding to a single frequency.

The migration then continues by operating on a set of individual constant frequency slices taken from the volume of 3-D Fourier transform coefficients. For each selected frequency slice, a separate single frequency migrated volume is computed by multiplying together—matrix element-by-matrix element—each element in the selected frequency slice times a corresponding element in a slice from the migration operator volume for that particular frequency, thereby forming a 2-D "product slice" of the same dimensions. (Those skilled in the art will recognize that this operation in effect calculates the 2-D convolution between the frequency and depth slices, the convolution having taken place in the wavenumber domain).

The product of these two slices (i.e., 2-D arrays of numbers arrays) is temporarily set aside. The same frequency slice is then multiplied by the second depth slice from the migration operator volume for that frequency, to form a second product array, and so on. Ultimately, this same frequency slice will have been multiplied by (convolved with) each of the migration operator depth slices for this frequency, thereby creating an output volume that has the same horizontal and vertical dimensions as the migration operator. This resulting volume will be termed a "single frequency" migration hereinafter. The previous operation is then repeated for every constant frequency slice within the selected range of frequencies,—each with its own migration operator volume—thereby producing as many single frequency migration volumes as there are frequency slices.

When the last frequency in the selected range has been processed, the single frequency migrations are then summed together to form a single composite volume. The preferred final step in the migration process is to calculate the 2-D inverse Fourier transform of each horizontal "slice" in the composite volume, thereby completing the process of calculating the 2-D convolution between the frequency slice and each of the migration operator depth slices. The inverse operation produces as its output a depth migrated version of the input common offset volume.

Note that, at least in theory, there must be as many precalculated migration operator volumes as there are selected frequency slices that are drawn from the 3-D Fourier transformed common offset data volume. However, a method of circumventing the need to separately calculate and store all of these volumes will be discussed hereinafter.

According to a second aspect of the instant invention, there is provided a method for calculating prestack depth and time migrations of common offset seismic volumes, wherein the velocity model takes the form of V(x,z) or V(y,z), a V(x,z) velocity model being one in which the velocity is allowed to vary in depth and in the horizontal coordinate "X"—but not in the horizontal "Y" coordinate. In this case, the migration can be represented as a series of 1-D (rather than 2-D as before) convolutions between migration operator volumes and a frequency slice from the Fourier transformed data. Also, as was discussed previously, the embedded convolutions in this migration computation can be calculated via a Fourier transform, thereby speeding up the calculation of the prestack migration significantly. But, because only 1-D convolutions are involved, the speed increase will not be as dramatic as that obtained for a V(z) velocity model.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DETAILED DESCRIPTION OF THE PREFERRED EMBODIMENTS

The present invention provides a new method of migrating unstacked common offset seismic data. Additionally, this method can be implemented in a form that is much faster to compute than conventional approaches. In more particular, the methods disclosed hereinafter can result in CPU runtime reductions of a factor of 100 or even more for common-offset prestack 3-D migrations, wherein the underlying velocity model is of certain specific types.

Figure 1:
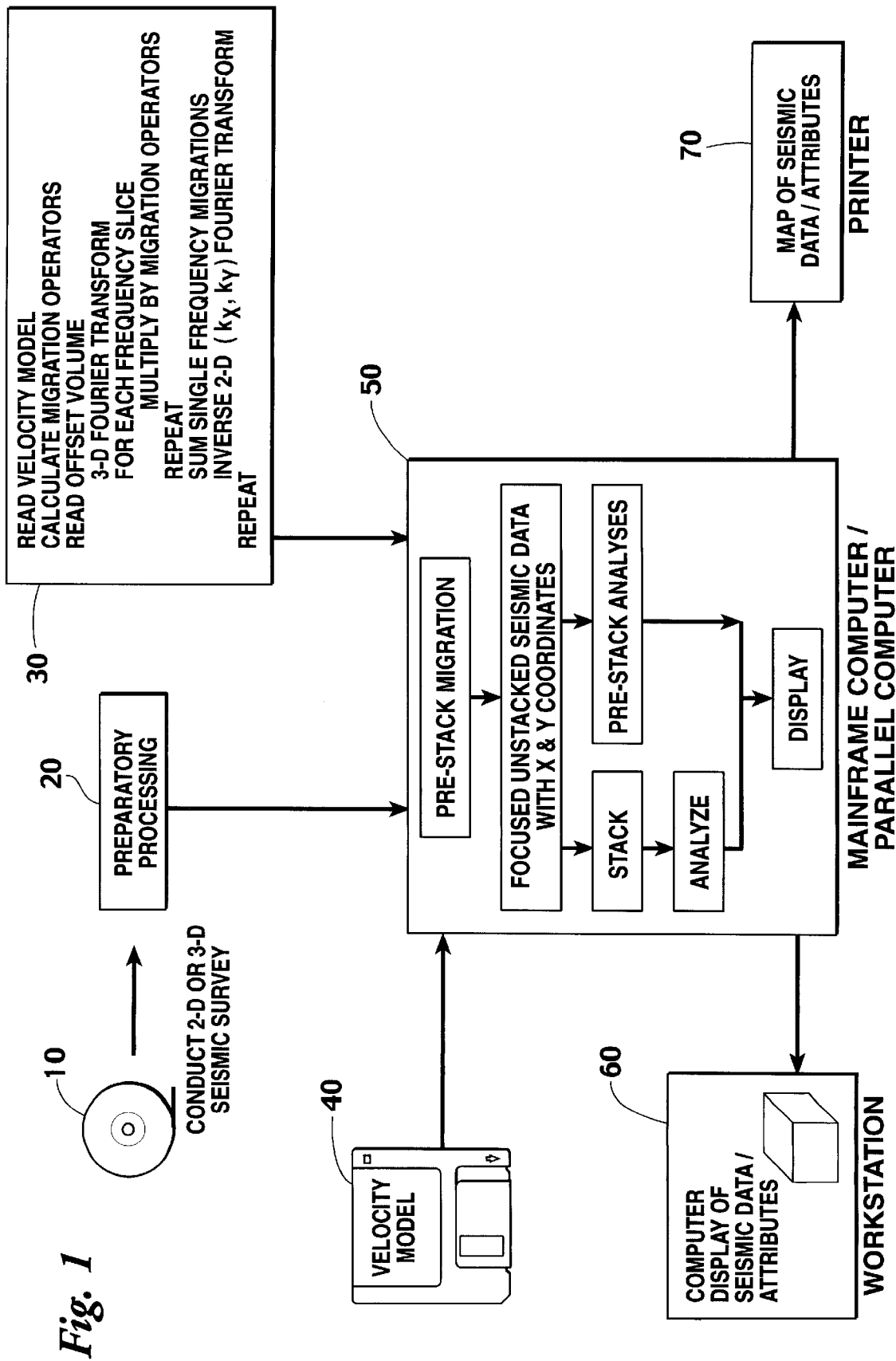
FIG. 1 illustrates generally the environment in which the invention disclosed herein would be used.

FIG. 1 illustrates the general environment in which the instant invention would typically be used. Seismic data (either 2-D or 3-D) are collected in the field 10 over a subsurface target of potential economic importance and are then brought back into the processing center. There a variety of preparatory processes 20 are applied to the seismic traces to make them ready for use by the methods disclosed hereinafter. The preparatory processes typically include the association of an X and Y surface coordinate with every processed trace (e.g., by a geometry routine). The processed traces would then be made available for use by the instant invention and might be stored, by way of example only, on hard disk, magnetic tape, magneto-optical disk or other mass storage means.

The methods disclosed herein would best be implemented in the form of a compiled or interpreted computer program 30 loaded onto a general purpose programmable computer 50 where it is accessible by a seismic interpreter or processor. A general purpose computer 50 includes, in addition to mainframes and workstations, computers that provide for parallel and massively parallel computations, wherein the computational load is distributed between two or more processors. As is also illustrated in FIG. 1, a velocity model 40 must be specified and provided as input to the computer program. The exact means by which such a model is created, digitized, stored, and later read during program execution is unimportant to the instant invention and those skilled in the art will recognize that this might be done any number of ways.

A program 30 embodying the instant invention might be conveyed into the computer that is to execute it by means of, for example, a floppy disk, a magnetic disk, a magnetic tape, a magneto-optical disk, an optical disk, a CD-ROM or loaded over a network. After the migration process has been applied to a prestack seismic data set, the resulting traces would then typically be sorted into CMP gathers, stacked, and displayed either at a high resolution color computer monitor 60 or in hard-copy form as a printed seismic section or a map 70. The seismic interpreter would then use the displayed images to assist him or her in identifying subsurface features conducive to the generation, migration, or accumulation of hydrocarbons.

Mathematical Background

The instant method is broadly founded on the following discovery: where a velocity function takes the form of V(z) as that term is known in the art ("horizontally layered," hereinafter), it is possible to represent a 3-D prestack migration as a convolution of a migration operator with the seismic data, provided that input seismic volume consists of traces having common offset from a shot. Since the migration can be expressed as a convolution, the Fourier transform can be used to implement it, thereby resulting in a substantial reduction in the number of operations required to calculate the migration. Note that the derivations that follow have been given to enable those skilled in the art to understand in a general way the particular migration approaches and velocity models that are appropriate for use as part of the instant method.

As a starting point, consider that a depth migrated seismic data volume may be expressed as a triple integral over the recorded seismic data:

$$m(x, y, z) = \int_{\omega_{min}}^{\omega_{max}} \int_{x_{min}}^{x_{max}} \int_{y_{min}}^{y_{max}} d y'$$

$$Amp(x', y', z, \omega, x, y)[\exp(i\Phi(x', y', z, \omega, x, y))] d(x', y', \omega)$$

where, m(x,y,z) is the depth-migrated (output) image volume at the point (x,y,z), d(x',y',ω) is the 1-D Fourier transformed (in the time direction) recorded seismic data volume, and Amp(·) and Φ(·) are general functions that represent the amplitude and phase factors, respectively, that characterize or define the particular migration method used. By way of explanation, the symbol "·" will be used as a placeholder to indicate that the arguments of a function have been temporarily suppressed for purposes of clarity and that the missing arguments may be taken as varying over their allowable range.

One particularly useful 3-D prestack migration formulation may be found in Bleistein, *On the Imaging of Reflectors in the Earth*, Geophysics, vol. 52, No. 7, July 1987, the disclosure of which is incorporated herein by reference. However, those skilled in the art will recognize that the derivation that follows applies equally well to any sort of prestack migration wherein the migration may be characterized as an operator that is applied to a data volume, and that Bleistein's approach is only one of many that could be used to illustrate the breakthrough disclosed herein. By way of example, another formulation that would lend itself to the approach discussed hereinafter may be found in Keho and Beydoun, *Paraxial ray Kirchhoff migration*, Geophysics, v. 53, No. 12, 1540–1546. However, Bleistein's migration characterization provides a preferred formulation for illustrating the instant invention.

Using Bleistein's approach, the amplitude and phase terms of the migration operator are expressed as follows:

$$m(x, y, z) =$$

$$\frac{1}{8\pi^3} \int_{x_{min}}^{x_{max}} \int_{y_{min}}^{y_{max}} dx' dy' \frac{1}{A(x, y, z, x'_S, y'_S) A(x, y, z, x'_R, y'_R)} \times$$

$$\frac{|H(x, y, z, x', y')|}{|\nabla t(x, y, z, x'_S, y'_S) + \nabla t(x, y, z, x'_R, y'_R)|^2} \times \int_{\omega_{min}}^{\omega_{max}} d\omega i \omega \Theta(\omega)$$

$$\exp[-i\omega(t(x, y, z, x'_S, y'_S) + t(x, y, z, x'_R, y'_R))] d(x', y', \omega),$$

where $$H(x, y, z, x', y') = \det \begin{bmatrix} \nabla [t(x, y, z, x'_S, y'_S) + t(x, y, z, x'_R, y'_R)] \\ \frac{\partial}{\partial x'} \nabla [t(x, y, z, x'_S, y'_S) + t(x, y, z, x'_R, y'_R)] \\ \frac{\partial}{\partial y'} \nabla [t(x, y, z, x'_S, y'_S) + t(x, y, z, x'_R, y'_R)] \end{bmatrix}.$$

(Note that H(·) is the determinant of the 3×3 matrix written on the right hand side of the previous equation). Θ(ω), in Bleistein's notation, is a smooth function with support wherever the seismic source has support in ω, or said another way, Θ(ω) is a filter that can be adjusted to limit the migration to a particular set of frequencies of interest. The function $t(x,y,z,x_S',y_S')$ represents the travel time of a seismic wave from a point in the subsurface (x,y,z) to the surface coordinates of a shot at location $(x_S',y_S')$ and $t(x,y,z,x_R',y_R')$ represents that travel time from (x,y,z) to a receiver at location$(x_R',Y_R')$. Similarly, A(·) represents the amplitude of a seismic wave that has traveled from a shot or a receiver to a point in the subsurface. The mathematical symbol ∇ operates to take the partial derivatives of its argument (i.e., it calculates the gradient), so H(x,y,z,x',y') is then the determinant of a 3×3 matrix whose first row consists of three elements, the first of which is the partial derivative with respect to "x" of the sum $t(x,y,z,x_S',y_S')+t(x,y,z,x_R',Y_R')$, i.e., $$\frac{\partial}{\partial x}[t(x, y, z, x'_S, y'_S) + t(x, y, z, x'_R, y'_R)].$$

The other two components of the first row are ∂/∂y and ∂/∂z of the sum, respectively.

The instant inventor has discovered that, in the event that the underlying velocity model is horizontally layered, the travel time function can be recast so as to depend upon only three parameters: z (depth), x-x', and y-y' (collectively, the two differences defining the offset and azimuth). So, assuming a horizontally layered velocity model, the travel time from any point on the surface (x'y', 0) to a point in the subsurface (x, y, z) can be calculated from a knowledge of the velocity model, the offsets—x-x' and y-y'—and depth. Rewriting the image equation using this simplification yields:

$$m(x, y, z) =$$

$$\frac{1}{8\pi^3} \int_{x_{min}}^{x_{max}} \int_{y_{min}}^{y_{max}} dx' dy' \frac{1}{A(x-x'_S, y-y'_S, z) A(x-x'_R, y-y'_R, z)} \times$$

$$\frac{|H(x-x', y-y', z)|}{|\nabla t(x-x'_S, y-y'_S, z) + \nabla t(x-x'_R, y-y'_R, z)|^2} \times$$

$$\int_{\omega_{min}}^{\omega_{max}} d\omega \Theta(\omega) \exp[-i\omega(t(x-x'_S, y-y'_S, z) +$$

$$t(x-x'_R, y-y'_R, z))] d(x', y', \omega)$$

with the travel time function t(·) being similarly modified in the defining equation for H(·). Now, if the variables of integration, x' and y', are taken to be the midpoint between source and receiver and if it is further assumed that m(x,y,z) and d(x',y',z) represent common offset volumes ($m_{CO}(x,y,z)$ and $d_{CO}(x',y',z)$ respectively hereinafter), the previous equations may be further modified to reflect a dependency only on the midpoint locations (x' and y') and the x and y offsets —$h_X$ and $h_Y$ respectively, these last two parameters being assumed to be constant values for this volume of data $$(x'_S, y'_S) = (x'+h_X, y'+h_Y)$$

$$(x'_R, y'_R) = (x'-h_X, y'-h_Y).$$

Now, with respect to the first equation of this section it follows that:

$$Amp(x, y, z, \omega, x', y') =$$

$$\frac{1}{8\pi^3} i\omega\Theta(\omega) \frac{|H(x-x', y-y', z)|}{A(x-x'_S, y-y'_S, z) A(x-x'_R, -y'_R, z)} \times$$

$$\frac{1}{|\nabla t(x-x'_S, y-y'_S, z) + \nabla t(x-x'_R, y-y'_R, z)|^2}$$

and $$\Phi(x, y, z, \omega, x', y') =$$

$$\omega[t(x-x', y-y', z, h_X, h_Y) + t(x-x', y-y', z, -h_X, -h_Y)].$$

Thus, the migrated data volume can be written as:

$$m_{CO}(x, y, z) = \int_{\omega_{min}}^{\omega_{max}} d\omega$$

$$\int_{x_{min}}^{x_{max}} dx' \int_{y_{min}}^{y_{max}} dy' g(x-x', y-y', z, \omega, h_X, h_Y) d_{CO}(x', y', \omega)$$

where the migration operator g(·) is defined as follows:

$$g(x-x', y-y', \omega, z, h_X, h_Y) = Amp(x-x', y-y', z, \omega, h_X, h_Y) \exp[i\Phi(x-x', y-y', z, \omega, h_X, h_Y)]$$

Those skilled in the art will recognize that the integrals over x' and y' in the previous integral equation represent the 2-D convolution at depth "z" of the migration operator g(·) with the 1-D Fourier transformed common offset data volume $d_{CO}(x',y',\omega)$ at frequency ω. It is important to note that the central discovery of the instant invention is embodied in the previous integral equation: the prestack migration of a common offset volume for a V(z) velocity model can be written as the sum (integral over ω) of the frequency-by-frequency 2-D convolutions of the Fourier transformed input data volume with the depth slices of a 3-D migration operator matched to that frequency. The fact that a 3-D prestack migration may be computed by way of a convolution has not previously been recognized in the art. Of course, there are many well known ways of implementing the previous equation as a numerical process suitable for use on a computer and a preferred method of doing so will be discussed hereinafter. Additionally note that, although the instant method has been expressed in terms of a depth migration, those skilled in the art will recognize that, by making a simple change in the previous integral equation, a corresponding equation may be developed which describes a time migration as a convolution:

$$m_{CO}(x, y, t) = \int_{\omega_{min}}^{\omega_{max}} d\omega$$

$$\int_{x_{min}}^{x_{max}} dx' \int_{y_{min}}^{y_{max}} dy' g(x-x', y-y', t, \omega, h_X, h_Y) d_{CO}(x', y', \omega),$$

where the "t" (time) replaces "z" depth. Of course, the precise definition of the operator g(·) will be somewhat different in this case, but those skilled in the art will immediately recognize how to obtain the appropriate migration operator for any particular migration formulation.

The fact that the previous migration equations contain an embedded 2-D convolution suggests a highly efficient way of computing that expression in practice: via a 2-D Fourier transform. Taking 2-D Fourier transforms (over the variables x and y) of both sides of the previous equation and changing the order of integration yields:

$$M_{CO}(k_X, k_Y, z) =$$

$$\int_{\omega_{min}}^{\omega_{max}} d\omega \int_{x_{min}}^{x_{max}} dx' \int_{y_{min}}^{y_{max}} dy' d_{CO}(x', y', \omega) \times \int_{x_{min}}^{x_{max}} dx$$

$$\int_{y_{min}}^{y_{max}} dy \, g(x-x', y-y', z, \omega, h_X, h_Y) e^{ik_X x} e^{ik_Y y}$$

where $M_{CO}(k_X,k_Y,z)$ represents the 2-D Fourier transformed migrated common offset volume. Let, $G(k_X,k_Y, z, \omega, h_X, h_Y)$ represent the 2-D Fourier transform with respect to x and y of the migration operator g(·). Now by virtue of the well known property of the Fourier transform known as the "shift theorem," the previous equation can be rewritten as:

$$M_{CO}(k_X, k_Y, z) = \int_{\omega_{min}}^{\omega_{max}} d\omega \int_{x_{min}}^{x_{max}} dx'$$

$$\int_{y_{min}}^{y_{max}} dy' G(k_X, k_Y, z, \omega, h_X, h_Y) d_{CO}(x', y', \omega) e^{ik_X x'} e^{ik_Y y'}.$$

However, the previous equation now contains still another 2-D Fourier transform—this time a transformation of the input seismic data. If the 2-D Fourier transform of the input common offset data volume is represented as $D_{CO}(k_X,k_Y,\omega)$, an equation that describes a computationally efficient means of calculating the 2-D Fourier transform of a prestack migration ($M_{co}(\cdot)$) is thereby obtained:

$$M_{CO}(k_X, k_Y, z) = \int_{\omega_{min}}^{\omega_{max}} d\omega \, G(k_X, k_Y, z, \omega, h_X, h_Y) \, d_{CO}(x', y', \omega).$$

Although a 2-D Fourier transform of a prestack common offset migration has some utility in its own right as a source of seismic attributes, the preferred next step is to compute $m_{co}(\cdot)$ from the previous expression by way of a 2-D inverse Fourier transform of $M_{co}(\cdot)$:

$$m_{CO}(x, y, z) = \frac{1}{4\pi^2} \int_{\min(k_X)}^{\max(k_X)} dk_X \int_{\min(k_Y)}^{\max(k_Y)} dk_Y$$
$$\int_{\omega_{\min}}^{\omega_{\max}} d\omega \, G(k_X, k_Y, z, \omega, h_X, h_Y) D_{CO}(k_X, k_Y, \omega) e^{-ik_X x} e^{-ik_Y y},$$

where the integration limits $\min(k_X)$, $\max(k_X)$, $\min(k_Y)$, and $\max(k_Y)$ are selected to be the maximum and minimum desired wavenumbers in the horizonal dimensions. In words, the foregoing equations indicate that, for the class of velocity models discussed previously, each depth slice in a migrated common offset data volume may be represented as the convolution of a migration operator with the data. Further, this observation suggests that through the use of a well know property of the Fourier transform, it will be possible (as this last equation shows) to calculate this convolution very efficiently via multiplication in the Fourier transform domain. Thus, a prestack 3-D migration may be performed by calculating the 2-D Fourier transform of a migration operator calculated for a particular velocity model and frequency; calculating the 3-D Fourier transform of a common offset volume; multiplying together the two at a plurality of different frequencies; adding together the products at those frequencies; and then calculating the inverse 2-D transform of the volume so produced.

Although it was the 2-D Fourier transform that was used in the previous derivation to speed up the calculation of the migration and it is the Fourier transform that is utilized in the preferred embodiment of this invention, those skilled in the art will recognize that there are other transforms besides the Fourier that would provide similar efficiency gains with respect to the computation of the embedded convolution between the migration operator and the data. Other transforms that might be used in place of the Fourier include, but are not limited to, the Hartley transform and certain classes of wavelet transforms that make calculation of the convolution more efficient. Although the discussion that follows will be couched mainly in terms of the Fourier transform, that has only been done for purposes of specificity and not out of any intention to so limit the scope of the invention.

The instant inventor has also discovered that the previous observation which relates migration and convolution for a V(z) velocity model, also applies (albeit in a more limited sense) to V(x,z) and V(y,z) velocity models. In brief: where the velocity function takes the form V(x,z) the prestack migration of a common offset data volume can be expressed as a 1-D convolution in the "Y" direction of a migration operator with the data, coupled with a conventional integration of the migration operator in the "X" direction. Note that, for purposes of specificity, only V(x,z) velocity models will be discussed hereinafter, but those skilled in the art will understand that "X" and "Y" are axis labels in an arbitrary coordinate system and, as such, may be freely interchanged as the situation warrants. The integral equation that describes a migrated common offset data volume where the velocity model is V(x,z) is:

$$m_{CO}(x, y, z) = \int_{\omega_{\min}}^{\omega_{\max}} d\omega$$
$$\int_{x_{\min}}^{x_{\max}} dx' \int_{y_{\min}}^{y_{\max}} dy' g(x, x', y - y', z, \omega, h_X, h_Y) d_{CO}(x', y', \omega),$$

where, once again, the particular form of the migration operator $g(\cdot)$ is determined by the choice of migration formulation and those skilled in the art will readily be able to compute that quantity, given the migration formulation.

The migration operator for this sort of velocity model is dependent, separately, on the two variables "x" and "x'", rather than on their difference ("x-x'"), whereas the variables "y" and "y'" still enter the equation only as a difference term. This just reflects the underlying shift invariance of the migration operator with respect to "y", but not "x". Similarly, the preceding integral equation contains an embedded convolution with respect to the "y" but not the "x" variable. The fact that a prestack migration of common offset seismic data for a V(x,z) velocity model contains an embedded 1-D convolution has not previously been recognized by those skilled in the art.

As before, it is possible to speed the calculation of this sort of migration by way of a 1-D Fourier transform. For a V(x,z) model, by taking a 1-D Fourier transform in the "Y" (i.e., non-varying) direction, the 1-D convolution can be computed in the frequency domain as multiplication:

$$M_{CO}^Y(x, k_Y, z) =$$
$$\int_{\omega_{\min}}^{\omega_{\max}} d\omega \int_{x_{\min}}^{x_{\max}} dx' G^Y(x, x', k_Y, z, \omega, h_X, h_Y) D_{CO}^Y(x', k_Y, \omega),$$

where the superscript "Y" in the previous equation indicates that a 1-D Fourier transform has been taken with respect to the "Y" variable. The migrated prestack common offset data volume is then obtained by taking the inverse 1-D (with respect to "Y") Fourier transform of the quantities in the previous equation:

$$m_{CO}(x, y, z) = \frac{1}{2\pi} \int_{\min(k_Y)}^{\max(k_Y)} dk_Y \int_{\omega_{\min}}^{\omega_{\max}} d\omega$$
$$\int_{x_{\min}}^{x_{\max}} dx' G^Y(x, x', k_Y, z, \omega, h_X, h_Y) D_{CO}^Y(x', k_Y, \omega) e^{-ik_Y y}$$

In summary, the previous equation demonstrates that a 3-D prestack migration of a common offset data volume may be computed for a V(x,z) velocity model by calculating a 1-D Fourier transform of the (common offset) data in the time direction; calculating a 1-D Fourier transform of the data and the migration operator in the "non-varying" surface direction; for each designated frequency, calculating a series of frequency domain 1-D convolutions in the "Y" direction between the data and the migration operator at every "X" CMP; integrating (adding together) the results of the 1-D convolutions; integrating (adding together) the results obtained at each designated frequency; and calculating an inverse 1-D Fourier transform of the final product.

Preparatory Processing

Figure 2:
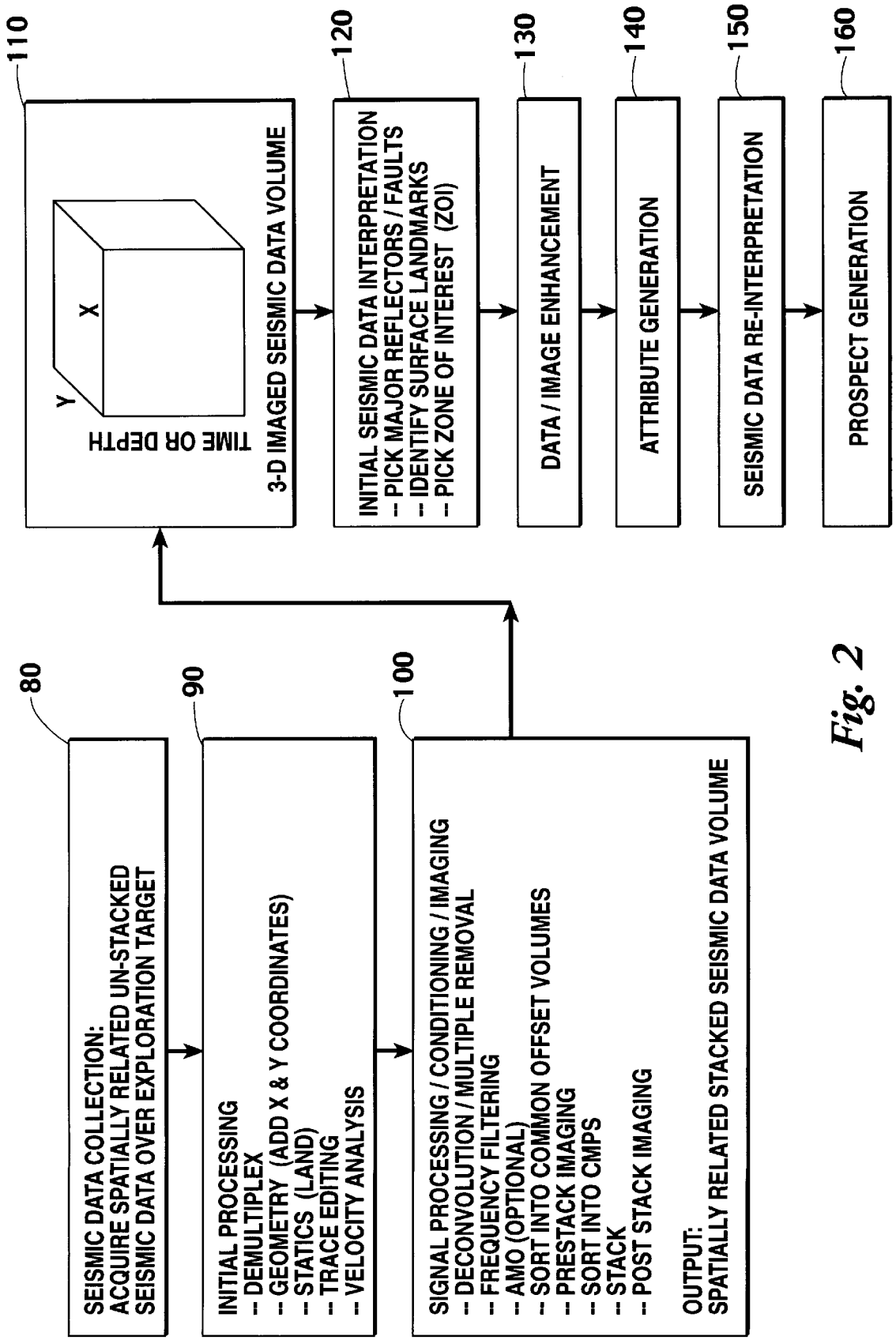
FIG. 2 is a schematic diagram that illustrates how the instant invention might be utilized within a conventional exploration seismic processing stream.

As a first step, and as is generally illustrated in FIG. 2, a seismic survey 80 is conducted over a particular portion of the earth. In the preferred embodiment, the survey will be 3-D, however data acquired from a 2-D survey could also be used. The data that are collected consist of unstacked (i.e., unsummed or prestack) seismic traces that contain digital information representative of the volume of the earth lying beneath the survey. Methods by which such data are obtained and processed into a form suitable for use by seismic processors and interpreters are well known to those skilled in the art. Additionally, those skilled in the art will recognize that the processing steps illustrated in FIG. 2 are only broadly representative of the sorts of steps that seismic data would normally go through before it is interpreted: the choice and order of the processing steps, and the particular algorithms invoked, may vary markedly depending on the individual seismic processor, the signal source (dynamite, vibrator, etc.), the survey location (land, sea, etc.) of the data, and the company that processes the data.

The goal of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D stacked seismic line extracted from a 3-D seismic survey or, preferably, an unstacked 3-D portion of a 3-D seismic survey, or a portion of a stacked 3-D survey. The invention disclosed herein is most effective when applied to a group of unstacked seismic traces that have an underlying spatial relationship with respect to some subsurface geological feature. Again for purposes of illustration only, the discussion that follows will be couched in terms of traces contained within an unstacked 3-D survey, although any assembled group of spatially related unstacked seismic traces could conceivably be used.

After the seismic data are acquired, they are typically brought back to the processing center where some initial or preparatory processing steps 90 are applied to them. As is illustrated in FIG. 2, a common early step is the specification of the geometry of the survey. As part of this step, each seismic trace is located on the surface of the earth with respect to the receiver (or array) that recorded that particular trace and the "shot" (or seismic source) that was recorded. The location information pertaining to both the shot surface location and receiver surface location are then made a permanent part of the seismic trace "header," a general purpose storage area that accompanies each seismic trace. This shot-receiver location information is later used to determine the location of the "stacked" (and unstacked) seismic traces for display and mapping purposes. More importantly, within the context of the instant invention this information is also used to determine the offset of each unstacked trace from the shot that is recorded on that trace.

After the prestack processing is completed, the instant method would preferably next be applied. In FIG. 2, the step 100 denominated "Signal Processing/Conditioning/Imaging" is one place within a processing sequence that would be an appropriate point at which to apply a prestack migration, as migration is an "imaging" process. As the method is preferably applied, the instant algorithm requires that the seismic data be presented in common offset volumes. There may be 60 or more common offset volumes associated with a typical marine survey and each of these volumes must be separately migrated, the precise number of offsets depending on the shooting geometry. It is customary to create these offset volumes by "sorting" the unstacked seismic traces based on information contained within the trace header, thereby associating together all traces having the same offset. After each common offset volume has been migrated, the output traces may then be sorted into CMP gathers for stacking or attribute analysis (step 100).

The requirement that the input seismic data be in the form of a "common offset" volume is a more restrictive condition than the conventional meaning of "common offset" might suggest. In more particular, "offset" and "common offset" will be used hereinafter to refer, not just to a collection of traces that have the same horizontal distance on the surface of the earth from the shot, but rather to a more restrictive "common azimuth" definition as that term is used, for example, in Biondi and Chemingui, *Transformation of 3-D prestack data by Azimuth Moveout (AMO), 64th Annual International Meeting, Society of Exploration Geophysicists*, Expanded Abstracts, 1541–1544, the disclosure of which is incorporated herein by reference. "Offset" will refer to a "vector" quantity that describes the X and Y surface separation between the source and a receiver. Thus, an offset of +500 meters from the shot to the "North" is a different offset from an offset of +500 meters to the "East." It should be noted, however, that the instant approach does exploit reciprocity between source and receiver in reaching its end result. (Source-receiver reciprocity implies, in brief, that a seismic trace recorded at location A from a shot at location B would be identical to a trace recorded at location B from a shot at location A).

Marine 3-D surveys are ideally suited for use by the instant invention because they usually have a fairly regular shot-receiver geometry. Land seismic data, however, tend to much be less regular than marine surveys and, as such, are poor candidates initially for migration by the instant method. However, the AMO transformation cited previously provides one method of regularizing a land survey so that it can be migrated via the instant invention. By way of brief explanation, AMO is a process that takes seismic traces of irregular surface coverage and azimuth angle and produces—through a mathematical transformation—a more regular data set that consists of traces that have some few number of predetermined azimuths/offsets. It is common, though not required, to then reduce the number of unstacked common-azimuth seismic traces by stacking together traces of the same azimuth/offset, thereby creating "composite" unstacked seismic traces which can be used in subsequent analysis. The AMO process can be used to create an approximation—and at times a very good one—to a common offset volume from traces acquired via otherwise irregular geometries. However, AMO is not without its limits and it produces better results from shooting geometries that are "nearly" regular to begin with (e.g., most marine 3-D data sets). Still, it is the preferred method of pre-processing land (and irregular marine) seismic data in preparation for application of the methods disclosed herein.

The ultimate goal of seismic processing is usually to produce a stacked seismic volume 110 or a stacked seismic line (2-D data). Thus, after processing by the instant invention, the traces within the migrated data volumes are typically sorted into CMP gathers and stacked before being presented to an explorationist for review. As is well known to those skilled in the art, a CMP gather is a collection of traces that all have the same midpoint between a shot and a receiver. A stack (or CMP stack) is horizontal sum of all the traces in a CMP gather, i.e., the numerical values from each trace at the same time point are summed together to produce a single output "stacked" trace that is an "average" of the input traces. Additionally, before stacking the traces it is customary to first correct them for offset from the shot ("normal moveout" or NMO), however the NMO correction will be assumed herein to be incorporated as part of the CMP stack and will not be considered separately.

The explorationist may do an initial interpretation 120 of the resulting stacked volume, wherein he or she locates and identifies the principal reflectors and faults wherever they occur in the data set. Finally, as noted in FIG. 2, the explorationist will use the processed seismic data to locate subsurface structural or stratigraphic features conducive to the generation, accumulation, or migration of hydrocarbons (i.e., prospect generation 160). This effort may incorporate additional data from a variety of non-seismic sources including, for example, well logs, satellite surveys, gravity surveys, etc. Additionally, the explorationist may use the migrated data volume (either stacked or unstacked) as a source for the generation of seismic attributes 140 that may be displayed 60 and studied in their own right. Seismic attributes 140 can reveal subsurface details that are at odds with the initial seismic data interpretation 120, thus suggesting the need for a reinterpretation 150 of the seismic volume before moving to the prospect generation 160 stage.

As is suggested in FIG. 2, any digital sample within a seismic volume 110 is uniquely identified by an (X,Y,TIME) triplet: the X and Y coordinates representing some location on the surface of the earth, and the time coordinate measuring a distance down the seismic trace. For purposes of specificity only, it will be assumed that the X direction corresponds to the "in-line" direction, and the Y measurement corresponds to the "cross-line" direction, as the terms "in-line" and "cross-line" are generally understood to mean in the art. Although time is the preferred and most common vertical axis unit, those skilled in the art understand that other units are certainly possible and might include, for example, depth or frequency. Additionally, it is well known to those skilled in the art that it is possible to convert seismic traces from one axis unit (e.g., time) to another (e.g., depth) using standard mathematical conversion techniques.

The Velocity Model

As a preliminary step, the interpreter or processor will be expected to specify a velocity model 40 for the migration. Theoretically speaking, it is only when the velocity model is horizontally layered that migration by the instant method will be computed correctly. The general form of such a model is pictured in FIG. 5 and consists of velocity/depth pairs that define the model (i.e., a V(z) model as that term is used and understood in the art, meaning that the velocities in the model are only a function of depth). More precisely, the velocity variations must occur independently of the shot / receiver X offset and Y offset.

Though the discussion herein will generally be in terms of a "layered" model, V(z) may, in fact, be some arbitrary continuous function of depth that has been sampled at intervals (equal or otherwise) of $\Delta z$. Practically speaking, however, V(z) may be thought of as being a discrete function, even if the underlying function that defines the relationship between velocity and depth is continuous because it is discretized in depth when the migration operator is constructed.

Each horizontal layer defines an interval of constant velocity within the model, but other rock parameters need not remain constant throughout the layer. Any rock property that is not used to compute the amplitude or travel time of the wave field may vary arbitrarily within a layer (i.e., the layer may be arbitrarily anisotropic, anisotropy being a term that is well known in the art and may be found defined in, by way of example, Sheriff, *Encyclopedic Dictionary of Exploration Geophysics*, Second Edition, Society of Exploration Geophysicists, 1984, on pages 8 and 9, the disclosure of which is incorporated by reference). On the other hand, rock parameters that are used to compute the amplitude or travel time of the wave field—e.g., P velocity, S velocity, attenuation/dissipation (Q), density, porosity, and permeability—may vary only in the depth direction for the V(z) embodiment.

Additionally, if the velocity model takes the form V(x,z), it is possible to exploit that regularity in calculating a prestack migration of common offset data volumes. Velocity models of this form will be generally referred to as "extruded" velocity models hereinafter and are known to those skilled in the art to be those models in which the velocity is allowed to vary both in depth and in one horizontal coordinate: the model is assumed to be constant with respect to the other horizontal coordinate. As before, rock parameters that do not interact with wave field amplitude or travel time may vary arbitrarily throughout the model. For purposes of illustration in the text that follows, an extruded velocity model will be assumed to take the form of V(x,z), corresponding results pertaining to a V(y,z) velocity model being easily obtained by a simple exchange of variables ("y" for "x").

Calculating the Numerical Green's Function Arrays

Figure 7A:
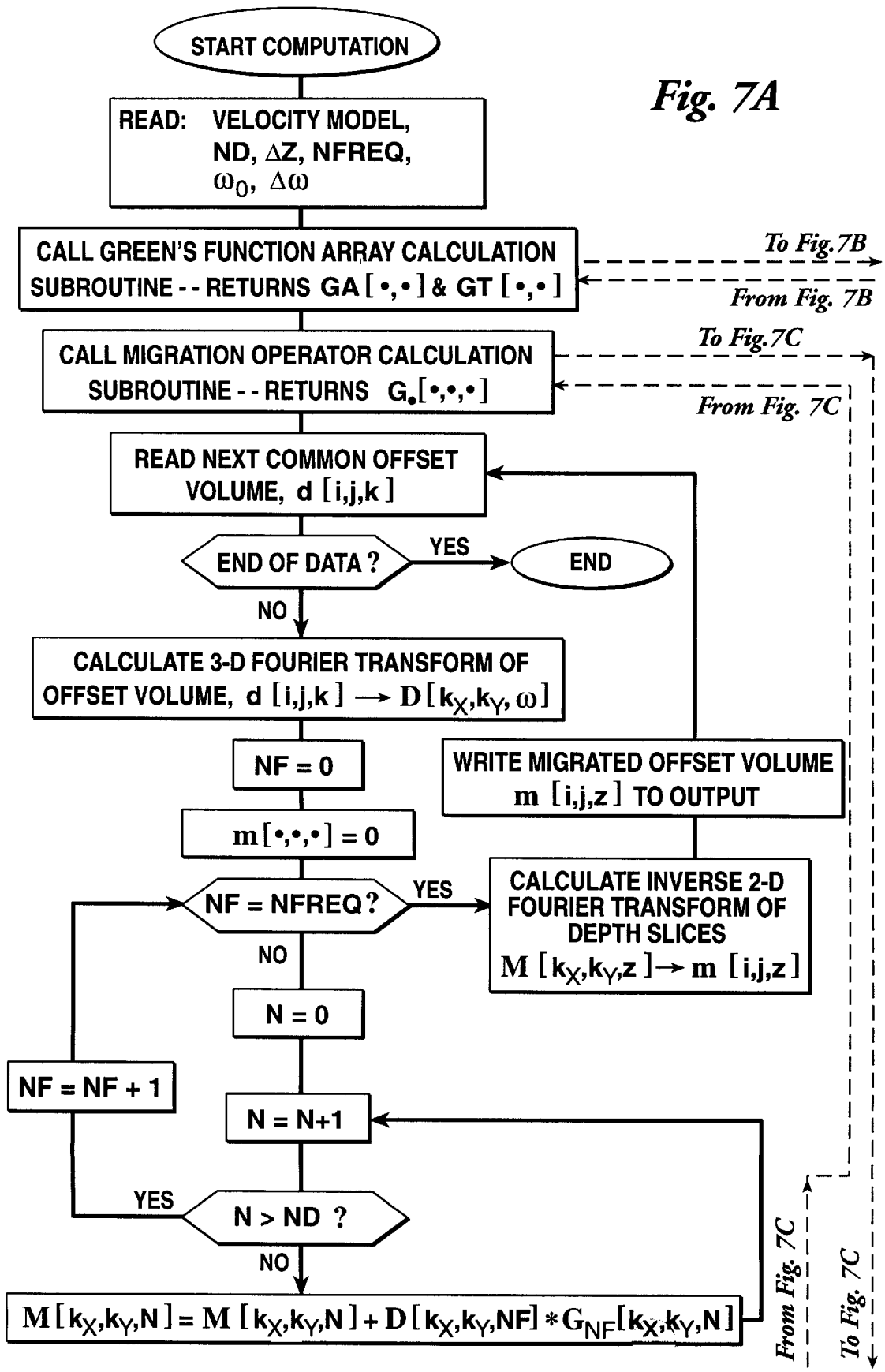
FIGS. 7A, 7B, 7C contains flow charts that illustrate in detail how a preferred embodiment of the instant invention might be implemented.
Figure 7B:
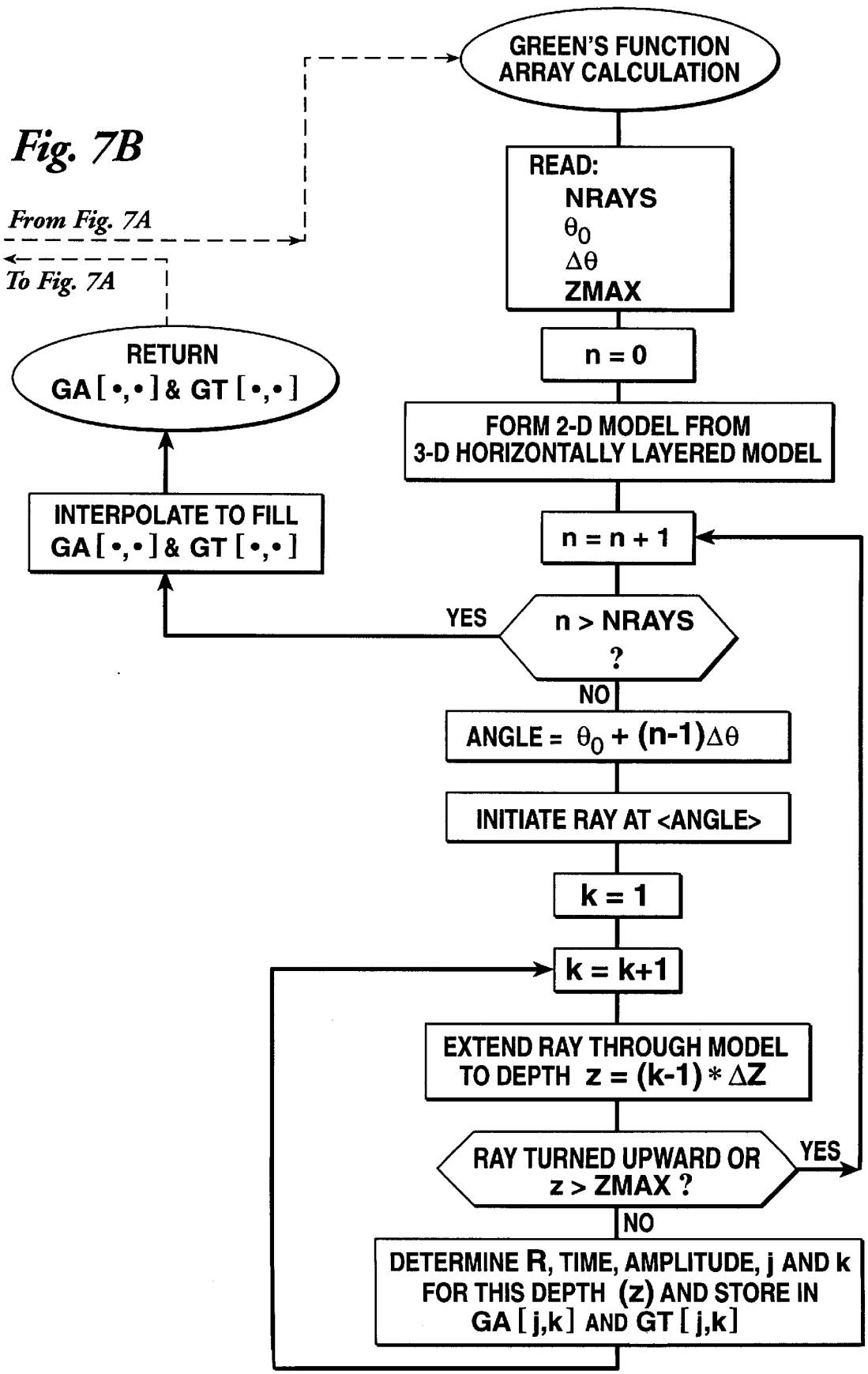

Turning now to FIG. 7B, wherein a preferred embodiment of the instant invention is illustrated in greater detail, the next step is to calculate the two numerical Green's function arrays for this velocity model. These two arrays provide a convenient source of data from which to calculate the migration operator, the migration operator being a volume of numerical values that is used to perform the actual migration. Physically, the two numerical Green's function arrays—amplitude (GA[i,j]) and time (GT[i,j])—represent the wave field amplitude and travel time respectively as a function of depth and radial offset for the specified model. Additionally, if the model is anisotropic, that fact may be accounted for by constructing a three dimensional Green's function array (i.e., GA[i,j,k] and GT[i,j,k]) and if the media is dispersive a four dimensional Green's function array (i.e., GA[ij,k,$\omega$] and GT[i,j,k,$\omega$], where $\omega$ represents frequency). Although only the isotropic non-dispersive case (i.e., the two-dimensional Green's function case) will be discussed hereinafter, those skilled in the art will be readily able to generalize this approach to include these additional cases.

Figure 5:
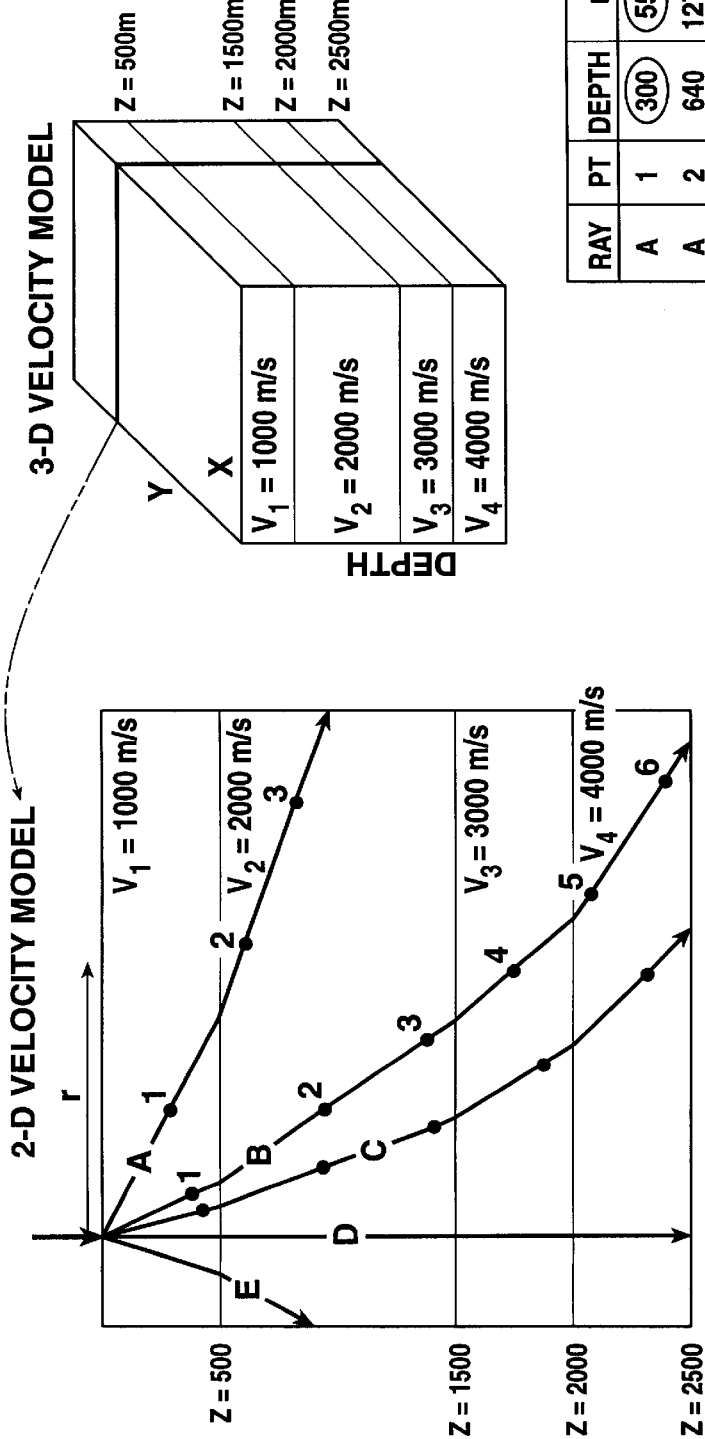
FIG. 5 illustrates a preferred method for calculating the Green's function arrays.
Figure 5:
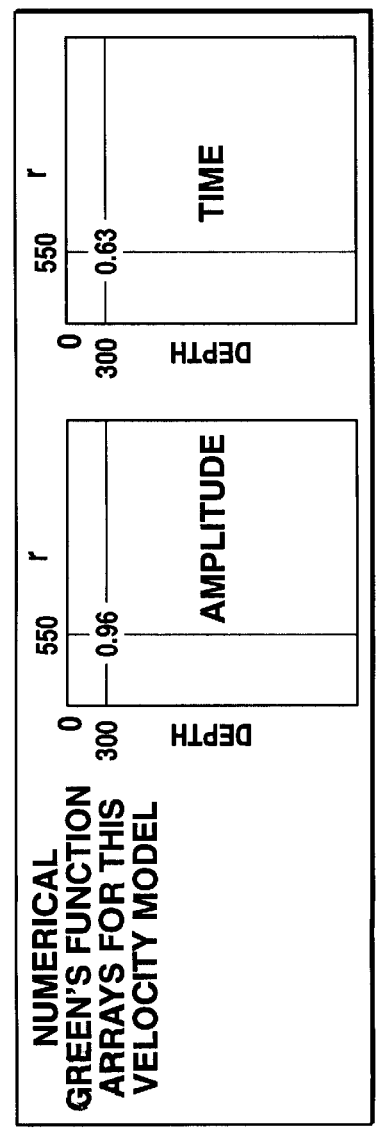

The Green's function arrays might be calculated in many different ways, however the preferred way of doing so utilizes ray tracing through the specified velocity model. As is generally illustrated in FIG. 5, a 2-D cross-section is extracted from the 3-D horizontally stratified velocity model. Then, a series of rays are traced into the subsurface using conventional ray-tracing techniques. In most cases, a collection of rays in the general shape of a "fan" would be utilized. However, in this case rays such as those labeled "E" in FIG. 5 need not be considered because rays that correspond to negative values of "r" are replicated in amplitude and travel time by rays corresponding to positive "r" values. In FIG. 7B, the fan is created by launching some predetermined number of rays (NRAYS) from the surface at a series of angles, beginning with $\theta_0$ (usually zero degrees or vertical) and incrementing the take-off angle in units of $\Delta\theta$ (usually 1° or less) from the vertical. A ray is traced through the model until it either turns upward or until reaches the maximum depth for this model (ZMAX in FIG. 7B).

It should be noted that because this operation (i.e., constructing the Green's function arrays) need be done only once for this migration, it is possible to invest a good deal of effort in the ray-tracing calculation without significantly increasing the overall migration run-time. This fact makes feasible the use of a high fidelity calculation of the values in the Green's function arrays, a high fidelity calculation taking into account such factors as "spherical" spreading, transmission effects, turning waves, intrinsic attenuation, anisotropy, etc., in calculation of the ray paths and amplitudes. This is in marked contrast to conventional approaches to prestack migration, which may require the computation of a Green's function for every shot / receiver location in the survey, thereby making high fidelity ray tracing generally impractical.

In FIG. 5 note that each ray is evaluated at a variety of points in the subsurface (e.g., Ray "A" is evaluated in this figure at three numbered points). Each sampled point gives rise to both a travel time and an amplitude and these values become entries in the respective Green's function tables. For example, in FIG. 5 note that Point 1 of Ray A is at a depth of 300 meters and is at a horizontal distance of 550 meters (r) from the source. Additionally, the amplitude at this point is 0.96 (based on an initial shot value of 1.0) and a wave front would require 0.63 seconds to travel to this subsurface location from a shot on the surface. Each of these values is then made a part of the GA[·,·] and GT[·,·] arrays as is generally indicated in FIG. 5, the depth and horizontal radius determining the row and column positions respectively into which the travel time and amplitude will be placed. The determination of the depth, "r", amplitude, and time values is repeated for a number of different rays and different point on those rays, thereby filling most of the cells in the GA[·,·] and GT[·,·] arrays.

One consequence of utilizing a ray-based approach to calculating the Green's function arrays, is that there may be entries in GA[·,·] and GT[·,·] that are not "filled" with amplitudes and times respectively. An array element [i,j] in GA[i,j] and GT[i,j] will not be filled unless a ray is sampled at the particular depth and "r" combination that is associated with that element. In fact, it may not be practical to track enough rays through the model to make sure that every element will be filled. Thus, it is customary in the industry to interpolate between the calculated values to fill any "holes" that remain in these arrays after the ray tracing has been done.

Figure 8A:
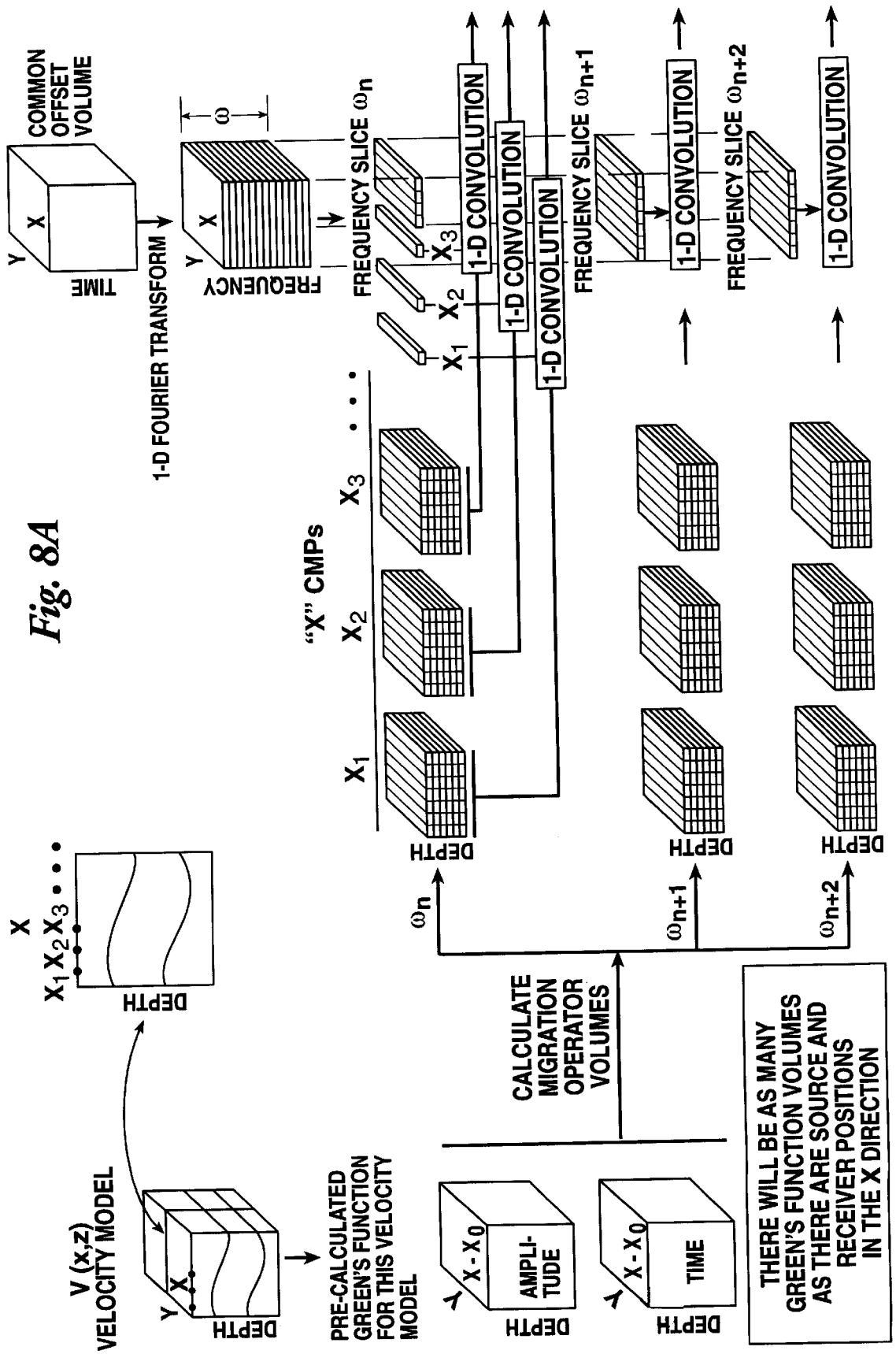
FIGS. 8A, 8B contains a schematic illustration of how the instant invention might be implemented on a common offset data volume for a V(x,z) velocity model.
Figure 8B:
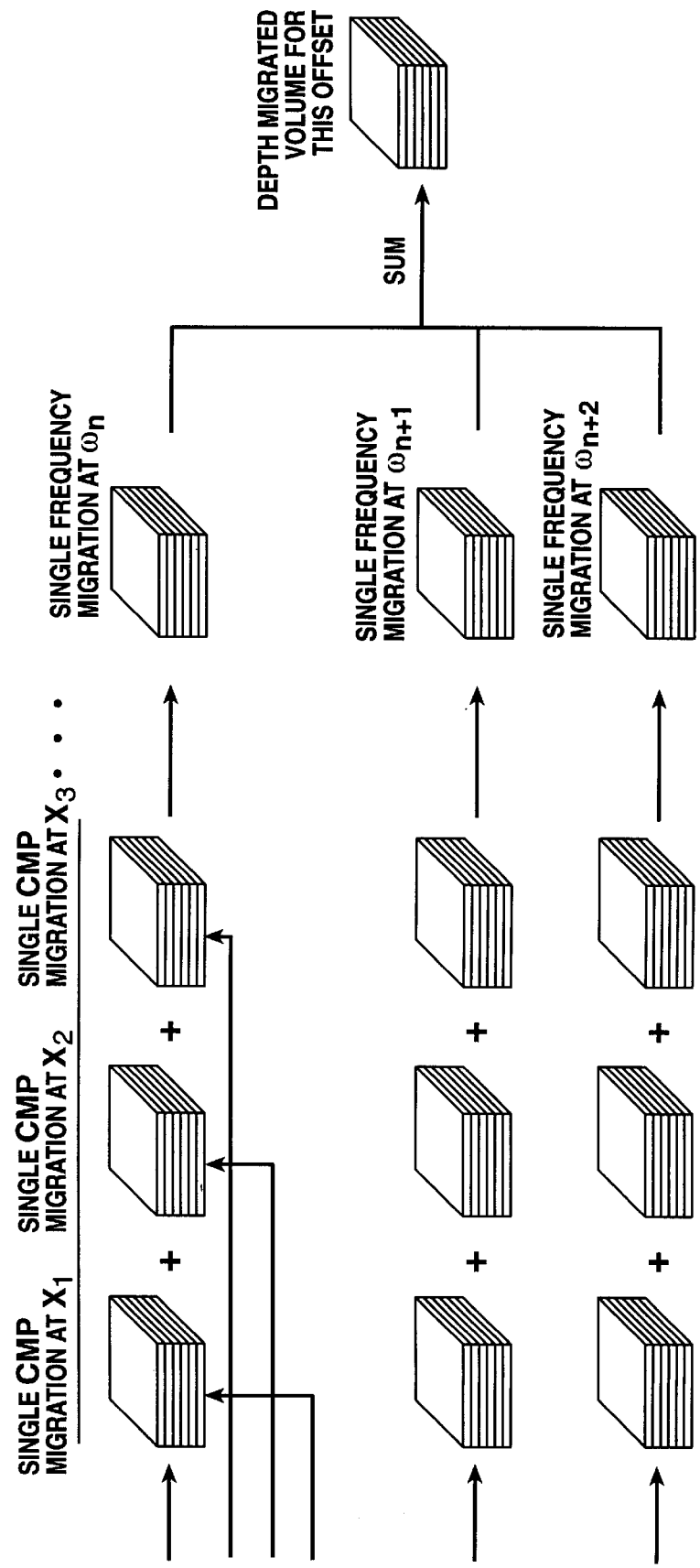

In the case of a V(x,z) velocity model, and as is broadly illustrated in FIG. 8, the Green's function time and amplitude arrays will be volumes (rather than 2-D matrices) preferably indexed by depth, Y offset, and "X-$X_0$," this last quantity representing the X offset from an arbitrary origin ($X_0$). The asymmetry in the Green's function indices just reflects the underlying asymmetry in the velocity model—a velocity model that is shift invariant with respect to the "Y" axis (i.e., a vertical slice in the velocity model taken orthogonal to the "Y" axis will yield the same cross section everywhere in the model, FIG. 8). The velocity variations in "X" have made it necessary to introduce into the Green's function a separate dependency on the "X" location within the model, hence the term "X-$X_O$." The elements in these arrays are again preferably calculated via ray tracing, but in this case the rays will be traced into a 3-D "subsurface" and will be initiated in the form of a "bowl" (rather than a "fan") configuration. Those skilled in the art will understand how the individual matrix elements of the Green's function arrays would be filled from travel times and amplitudes produced by the ray tracing operation.

Finally, those skilled in the art know that not all migration algorithms require the computation of Green's function arrays. In some cases, the migration operator can be calculated directly without the intermediate step of calculating Green's function. For example, when the velocity model consists of a single constant velocity or when V(z)=$V_0$+Kz, the migration operator may be calculated directly. In those cases, the inventor anticipates that the migration operator, however it is calculated, will be used in exactly same way as is illustrated below.

Calculating the Migration Operator Volumes

Although the process by which the migration operator is constructed from the Green's function arrays is generally well known to those skilled in the art, the steps involved will be briefly reviewed here for purposes of illustrating a preferred embodiment of the instant invention. It is not intended that the scope of this application be limited to the single approach to calculating the migration operator disclosed herein. Indeed, many variations of the approach considered here are possible and are well know to those skilled in the art.

Figure 3A:
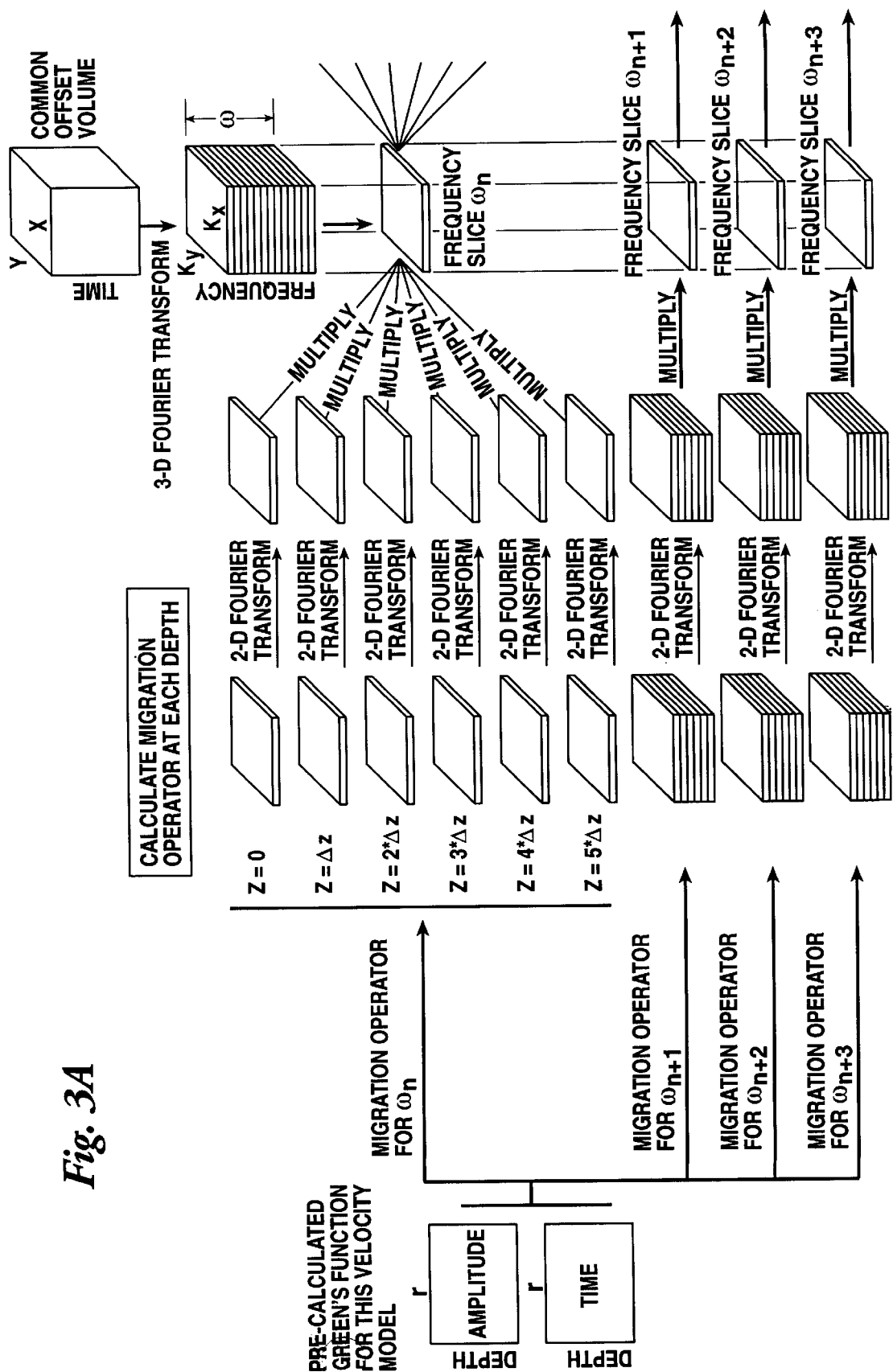
FIGS. 3A, 3B displays the broad scheme utilized by the instant invention to produce a computationally efficient common offset prestack migration.
Figure 3B:
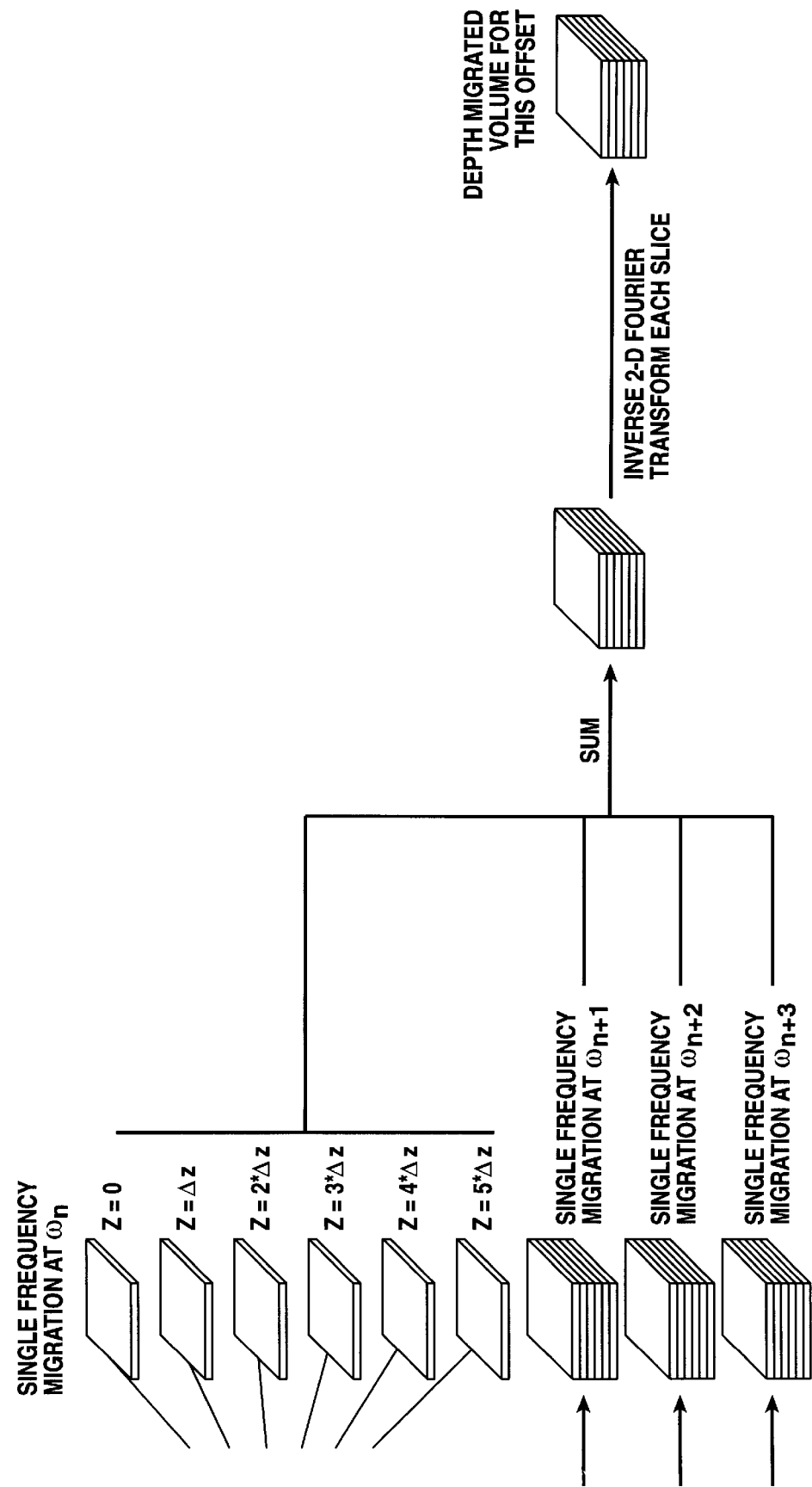

The numerical Green's function arrays, GA[·,·] and GT[·,·], are preferably used to calculate the migration operator at a variety of depths in the subsurface. It is customary, as generally illustrated in FIG. 3, to calculate the migration operator at a plurality of different depths, each depth differing from the next by some constant step amount, defined hereinafter to be Δz. If the initial depth is defined to be zero (i.e., the surface of the ground), subsequent depth layers will be found at depths K*Δz, where K is an integer between 1 and ND, where ND represents the number of depth levels in the output migration. Those skilled in the art will realize that equally spaced depth steps are a convenience, not a necessity, and other arrangements have been contemplated by the instant inventor. In the preferred embodiment, about 1000 depth steps would be utilized and Δz would be equal to 7.5 meters to 10 meters.

Figure 6:
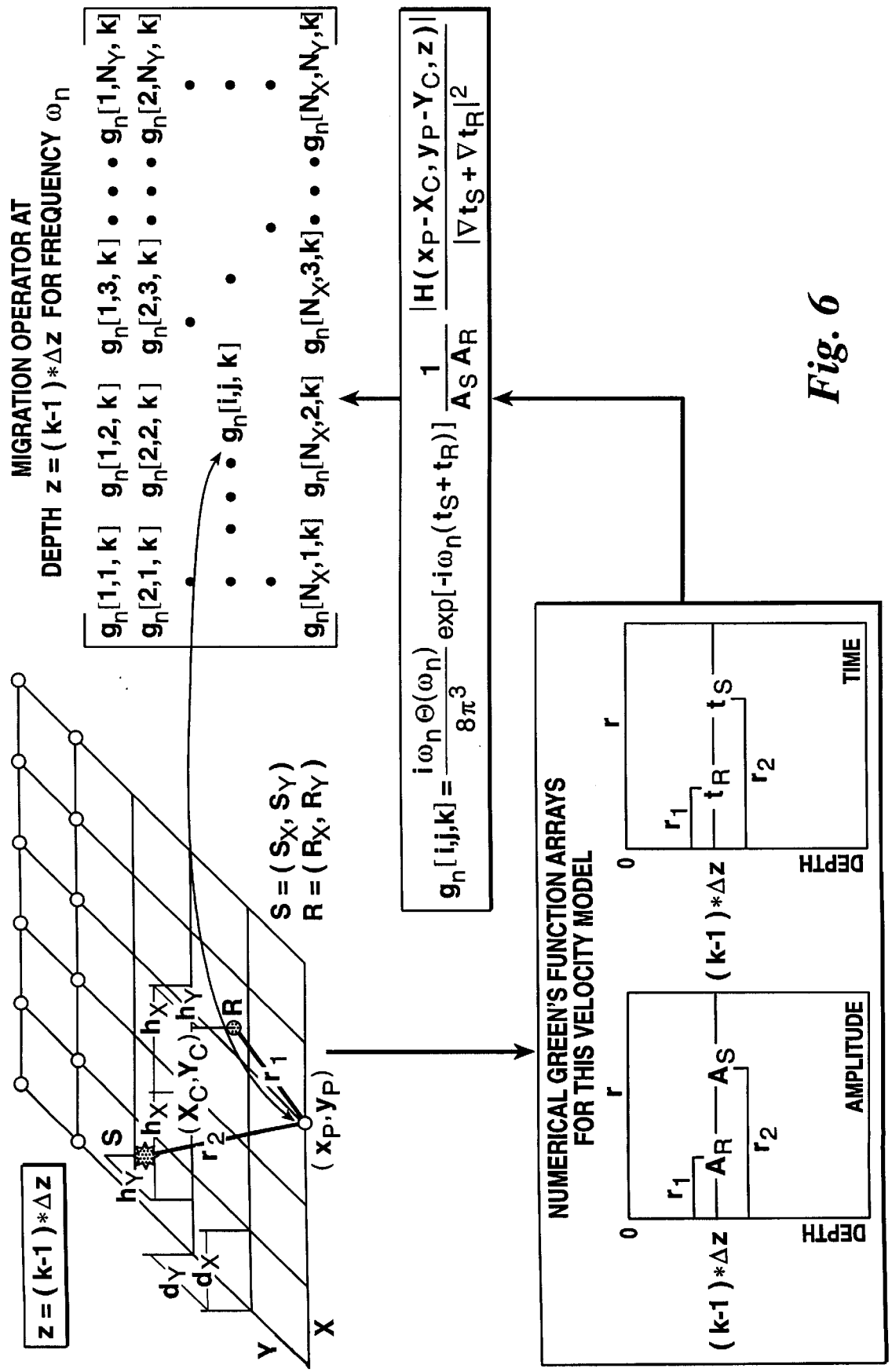
FIG. 6 is a schematic illustration of a method of computing the numerical Green's function arrays.
Figure 7C:
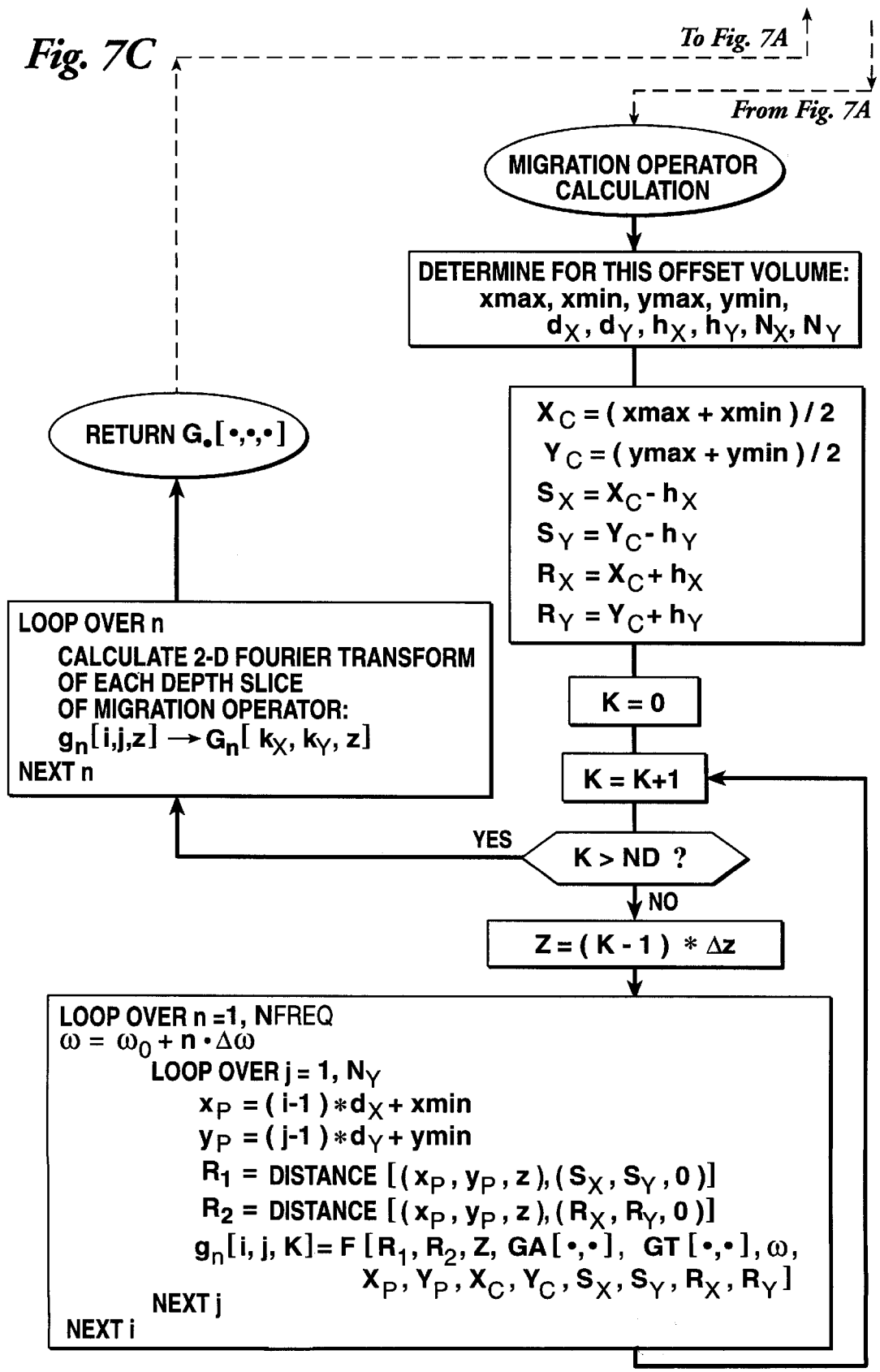

Turning now to FIGS. 6 and 7C wherein the process of calculating a migration operator is illustrated in more detail, note that the operator for any depth and frequency takes the form of an $N_X$ by $N_Y$ matrix whose dimensions match those of the seismic survey, where $N_X$ represents the number of in-line traces and $N_Y$ the number of cross line traces in the common offset volume. Said another way, there is a numerical value in a migration operator for each trace in this common offset volume. It is preferable, though not required, that the horizontal dimensions of this matrix (and, indeed, the dimensions of the common offset volume, $N_X$ by $N_Y$) be of the form $N_X=2^m3^n5^p$ and $N_Y=2^k3^l5^q$, where m, n, p, k, l, and q are all integers, so that a mixed radix fast Fourier transform may be utilized at the next step. That being said, if these dimensions are not amenable to computation via a mixed radix fast Fourier transform, a general discrete Fourier transform might be used instead.

Let $g_n[i,j,k]$ be an arbitrary element in the migration operator matrix, where the "k" index is preferably linked to the depth, z, as follows:

$z=(k-1)*\Delta Z,$ k=1, ND, and where "n" is a counting index that is tied to frequency, i.e., $g_0[i,j,k]$ is a migration operator volume for frequency $\omega_0$, $g_1[i,j,k]$ is matched with $\omega_1$, etc. Additionally, assume, that the in-line and cross-line trace spacings for this survey are represented by $d_X$ and $d_Y$, respectively. Further, assume that the constant-offset seismic volume is bounded within some cartesian coordinate system by the surface coordinates (xmin, xmax, ymin, ymax) as follows: in the in-line direction the trace locations are bounded by xmin and xmax; and in the cross-line direction by ymin and ymax. These variables represent typical predefined quantities that might be utilized in an operator calculation program (FIG. 7C). Thus, in the preferred embodiment each element of the migration operator matrix $g_n[\cdot]$ corresponds to a particular surface location that is dependent on the trace spacing. For purposes of specificity, it will be assumed that the migration operator element $g_n[i,j,k]$ corresponds to surface location (x,y) where:

$x=(i-1)*d_X+\text{xmin}$ $y=(j-1)*d_Y+\text{ymin}.$

Finally, an arbitrary origin is selected for the coordinate system of the survey. A convenient choice would be the geographic midpoint of the unstacked volume:

$$X_C = (\text{xmax} + \text{xmin})/2$$

$$Y_C = (\text{ymax} + \text{ymin})/2,$$

although many other choices would be feasible.

Each element of the migration operator may be thought of as consisting of two factors: an amplitude factor and a time-dependent factor, both of which depend on values stored in the numerical Green's function arrays. FIG. 6 illustrates in a general way how these factors might be extracted and how the value of the element $g_n[i,j,k]$ might be calculated from these values. Let $(x_p, y_p)$ represent the surface location of $g_n[i,j,k]$, and let S and R represent generalized shot and receiver locations for this offset:

$$S = (X_C - h_X, Y_C - h_Y) = (S_X, S_Y)$$

$$R = (X_C + h_X, Y_C + h_Y) = (R_X, R_Y)$$

The radial distance ("$r_1$") from the receiver is then the distance from $(x_p, y_p)$ to S, or $$r_1 = \sqrt{(x_P - S_X)^2 + (y_P - S_Y)^2}$$

and the receiver radial distance is $$r_2 = \sqrt{(x_P - R_X)^2 + (y_P - R_Y)^2}.$$

The amplitude factor is extracted from the appropriate numerical Green's function amplitude matrix, GA[·], by selecting, from the row in the array corresponding to the current depth ("m" for purposes of illustration, thus GA[m, ·]), the amplitude corresponding to $r_1$ ($A_R$) and, then, the amplitude corresponding to $r_2$ ($A_S$). This process is illustrated graphically in FIG. 6. The product of the inverse of these two values gives the correct amplitude term for this position in the migration operator.

The time components of the operator are similarly extracted from the Green's function time matrix (GT[m,·]). As before, within the row corresponding to the current depth ("m" once again) the travel times corresponding to $r_1$ (represent this time as "$t_R$") and $r_2$ ("$t_S$") are selected and extracted. Finally, the Kirchhoff migration operator element corresponding to this position is calculated from the expression:

$$g_n[i,j,k] = \left(\frac{i\omega_n \Theta(\omega_n)}{8\pi^3} \exp[-i\omega_n(t_S + t_R)]\right) \frac{1}{A_S A_R} \frac{|H(x_P - X_C, y_P - Y_C, z)|}{|\nabla t_S + \nabla t_R|^2},$$

where, $$t_S = t(x_P - S_X, y_P - S_Y, z)$$

$$t_R = t(x_P - R_X, y_P - R_Y, z)$$

$\omega_n$ is the frequency for which this operator has been calculated, and $t_S$ and $t_R$ represent, respectively, the travel time from the point $(x_P, y_P, z)$ to the shot $(S_X, S_Y, 0)$ and receiver $(R_X, R_Y, 0)$. Although it is certainly possible to pre-calculate $g_n[\cdot]$ for all values of depth and frequency, in practice that would normally not be done as the storage requirements would be substantial: a separate migration operator volume must be created and stored for each frequency use in the migration (at least $N_X \cdot N_Y \cdot ND \cdot NFREQ$ words of storage, where NFREQ is the number of frequency slices processed by the migration). However, some substantial economies in numerical computation and storage requirements may be obtained by noting that the migration operator is formed by multiplying together a frequency dependent term (within parenthesis in the defining equation for $g_n[\cdot]$) and a frequency independent term. This suggests that, in the interest of computational efficiency, two volumes should be precalculated outside of the migration loop: one containing the frequency independent terms of $g_n[\cdot]$:

$$a[i,j,k] = \frac{1}{8\pi^3 A_S A_R} \frac{|H(x_P - X_C, y_P - Y_C, z)|}{|\nabla t_S + \nabla t_R|^2},$$

and the other containing ($t_S + t_R$) as a function of i, j, and k. These two arrays can then be quickly used to quickly construct $g_n[\cdot]$ at any frequency. That being said, in order to improve the clarity of the text that follows, it will be assumed that the entire migration operator has been precalculated and stored where it can be obtained by the core migration program as needed.

Note that the partial derivatives of $t_S$ and $t_R$ with respect to x, y, and z, are computed numerically via any number of conventional methods. One example of a preferred method would be to calculate the partial derivatives by the chain rule. For the "x" variable:

$$\frac{\partial t}{\partial x} = \frac{\partial t}{\partial r}\frac{\partial r}{\partial x} = \frac{\partial t}{\partial r}\frac{\partial}{\partial x}\left\{\left(\sqrt{x^2 + y^2}\right)\right\} = \frac{\partial t}{\partial r}\frac{x}{\sqrt{x^2 + y^2}}.$$

The partial derivative of t with respect to "r" can then be directly determined numerically from the GT[·] array. The partial derivative of t with respect to z can be obtained by differencing two adjacent rows (depths) of the GT[·] array.

As a final step, in the preferred embodiment a 2-D Fourier transform is taken of each depth slice in the $g_n[·,·,z]$ matrix, the symbol "z" indicating that the "vertical" or slice dimension of this matrix is depth. Let $G_n[·,·,z]$ represent the horizontal slice-by-slice 2-D Fourier transform (i.e., with respect to "x" and "y") of the $g_n[·,·,z]$ matrix. That is, 2-D Fourier Transform$\{g_n[x,y,z]\} = G_n[k_X, k_Y, z]$, where the units of the $G_n[·]$ array are (X wavenumber, Y wavenumber, and depth). That being said, it is also possible that the migration operator might be convolved directly with the frequency slices of the prestack common offset data volume. In that case, the 2-D Fourier transform of the depth slices of the operator array would not be computed. This possibility will be discussed in the next section.

For the V(x,z) velocity model, the numerical values that comprise a migration operator volume would now have a dependency on the X coordinate, which dependency will be represented symbolically hereinafter as $g_{n,m}[i,j,k]$, m=1, $N_X$. The variable "m" denotes a CMP position on the surface of the earth and a separate migration operator volume will be calculated for each such surface position within the common offset volume. Calculating a migration operator of this form is a straightforward generalization of the approach discussed previously and methods for doing so are well known to those skilled in the art. By way of example, an equation that describes a Kirchhoff operator for a V(x,z) model is:

$$g_{n,m}[i,j,k] = \left(\frac{i\omega_n \Theta(\omega_n)}{8\pi^3} \exp[-i\omega_n(t_S + t_R)]\right) \frac{1}{A_S A_R} \cdot \frac{|H(x_P, X_C, y_P - Y_C, z)|}{|\nabla t_S + \nabla t_R|^2}$$

Note that, in addition to the separate dependency of the previous equation on $x_P$ and $X_C$, selection of a $V(x,z)$ velocity model will result in changes in the calculated values of $t_S$ and $t_R$ and their derivatives, reflecting, as they do, travel times within the specified model.

In theory at least, this sort of velocity model would require the computation of as many 3-D operator volumes are there are frequencies to be processed, times the number of midpoint positions in X (i.e., NFREQ times $N_X$), as determined by the contents of the common offset volume. In practice, all of the volumes may or may not be precalculated and it might be desirable in some instances to simply calculate the migration operators as needed to reduce the storage requirements.

Finally, although the preceding discussion has been couched exclusively in terms of calculating a depth migration, those skilled in the art will understand that a time migration may be computed instead by making only minimal modifications to the disclosed method. In that case, successive slices of the of the migration operator volume are separated by equally spaced units of time (e.g, 0.004 seconds), it being well known to those skilled in the art how to create same-interval migration time steps from a horizontally layered model. The time migration operator is applied in exactly the same fashion as that for a depth migration: a 2-D convolution is computed between a constant frequency slice from the transformed data volume and a time (rather than depth) slice from the operator volume for that frequency. The output from this sort of migration will be a data volume that has vertical units of "time" rather than "depth." Thus, in the disclosure contained herein, unless specifically indicated otherwise, a migration operator may be taken to be either in depth or time, and the term "planar slice" of the migration operator will be used in a generic sense to refer to the extraction of a horizontal slice of a migration operator that might be either time-based or depth-based.

Application of the Migration Operator

The foregoing steps, having all preferably been performed outside the core migration algorithm, have paved the way for the actual application of the migration operator that follows. As is illustrated in FIG. 7A, a first offset volume is read into the array d[i,j,k]. Let "NSAMP" be the number of digital samples in each seismic trace and let d[i,j,k], i=1,$N_X$, j=$N_Y$, and k=1, NSAMP, represent a single common offset volume—the input data for the migration. In the preferred embodiment, this data volume is thereafter transformed by a 3-D Fourier transform to produce an array of Fourier transform coefficients which are stored in the array D[$k_X$, $k_Y$,$\omega$], the precise operations necessary to perform this transformation being well known to those skilled in the art. The units of the array D[·] are (X wavenumber, Y wavenumber, and frequency). It is not necessary that the entire common offset volume be resident in memory at one time in order to calculate a 3-D Fourier transformation. For example, by calculating a 1-D (time) Fourier transform of the entire common offset data volume initially and, as each frequency slice is read into memory for processing, calculating a 2-D transform of only that frequency slice, a 3-D Fourier transform of the data volume may be obtained without having the entire volume memory resident.

In simplest terms the 2-D Fourier transform (M[$k_X$, $k_Y$, z]) of the migrated common offset volume m[i,j,k] is formed by multiplying together a migration operator at a plurality of depths with constant frequency "slices" from the 3-D Fourier transformed data. In terms of equations, a "single frequency" migration at frequency $\omega_{n-1}$ (e.g., the "nth" slice of the Fourier transformed data matrix) is obtained by multiplying a 2-D frequency slice coefficient-by-coefficient times the corresponding element of the migration operator for that frequency at each of its depth levels:

$$SF_n[i,j,m] = D[i,j,n] G_n[ij,m].$$

for m=1 to ND, "n" fixed, i=1, $N_X$, j=1, $N_Y$, and $SF_n[\cdot]$ representing a single frequency migration of the "nth" frequency slice. (Multiplication "element-by-element" or "coefficient-by-coefficient" is performed by multiplying corresponding elements in the two arrays as the previous equation indicates. This operation should be distinguished from a matrix multiplication of the two slices.) This results in the production of a single frequency migrated data volume for each slice so processed. This single frequency migration is then set aside and additional single frequency migrations are calculated until the frequency range specified by the user has been covered.

After all of the selected frequency slices have been processed, the migrated common-offset volume is constructed by summing together—element-by-element—all of the individual single frequency migrated volumes:

$$M[i,j,k] = \sum_{n=1}^{NFREQ} SF_n[i,j,k]$$

(Note in FIG. 7A that M[·] actually accumulates the frequency domain products as they are calculated, rather than storing and summing the separate single frequency migrated volumes. This approach will produce answers that are numerically equivalent to those obtained by the previous equation.)

Finally, each "slice" of the M[·,·,k] (k fixed) array must be inverse 2-D transformed back to the offset domain, thereby producing the desired migrated common-offset volume of seismic traces, m[i,j,k]. The precise procedure for calculating the inverse 2-D Fourier transform of each slice of M[·] to produce m[·] is well known to those skilled in the art.

Of course, the foregoing just describes the process necessary to migrate a single common offset volume. In practice, a number of common offset volumes from the same survey would be migrated and thereafter sorted into CMP gathers and stacked, the end result of this process being a stacked 3-D seismic volume that is ready for use by an explorationist. Additionally, the unstacked migrated traces are also available as input for analyses such as AVO (amplitude versus offset), AVA (amplitude versus angle of incidence) and many other attribute-generating processes.

It should be clear that a computer program that implements the foregoing steps need not be required to perform the calculation of the 1-D Fourier transform of the seismic data nor to perform the calculation of the values in the migration operator volume. It is certainly possible—and this prospect has been specifically contemplated by the instant inventor—that the seismic data might come to the migration program "preprocessed," having already been transformed into the frequency domain (by a 1-D Fourier or 3-D Fourier transform). Additionally, it is contemplated that the migration operator will be provided "precalculated" to the module that implements the migration. Optionally, each depth slice in the migration operator may already have been processed via a 2-D Fourier transform, if the 2-D convolution between the migration operator and the seismic data is to be performed via multiplication in the Fourier domain.

Note that it is not necessary, nor is it generally desirable, to migrate every frequency slice in the data. It is well known that a conventional discrete Fourier transform of a seismic trace of length "NSAMP" produces coefficients that provide estimates of the trace spectral amplitude at the following Fourier frequencies:

$$\omega_n = \frac{n}{NSAMP(\Delta t/1000)}, n = -\frac{NSAMP}{2}, \ldots, 0, \ldots \frac{NSAMP}{2} - 1,$$

the "nth" slice of D[·] generally containing Fourier coefficients corresponding to frequency $\omega_{n-1}$, $n \geq 1$. In most instances, seismic data contains little useful information at the highest and lowest Fourier frequencies. Thus, it is often possible to speed up the prestack migration even further by migrating only the subset of the Fourier frequencies in which the signal predominates over the noise. This choice of the precise frequency range to migrate is, of course, highly data dependent and the range will generally differ depending on, for example, the particular recording parameters and data quality.

Figure 4A:
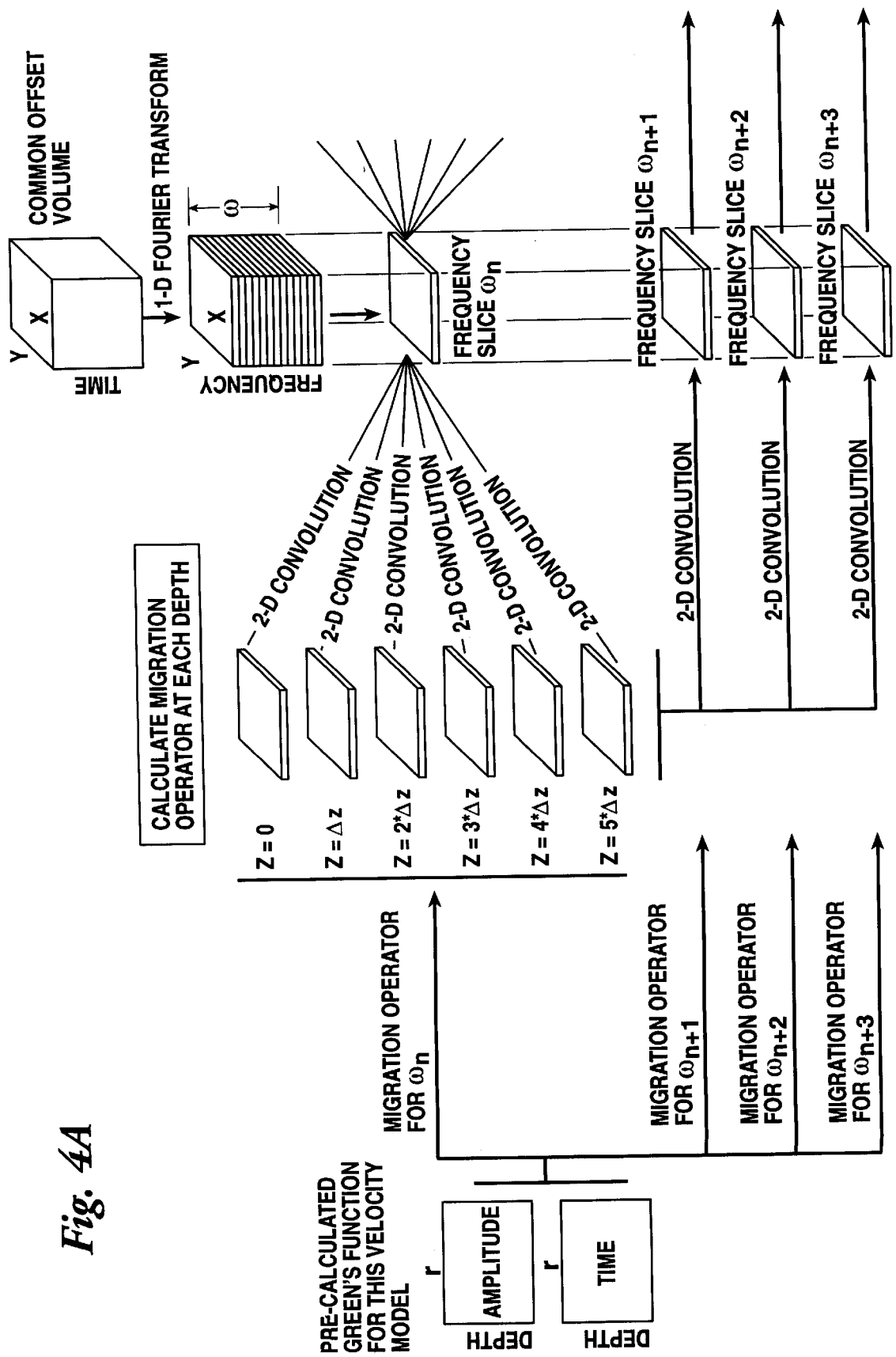
FIGS. 4A, 4B contains a schematic illustration of how the instant invention might be directly implemented on a common offset data volume.
Figure 4B:
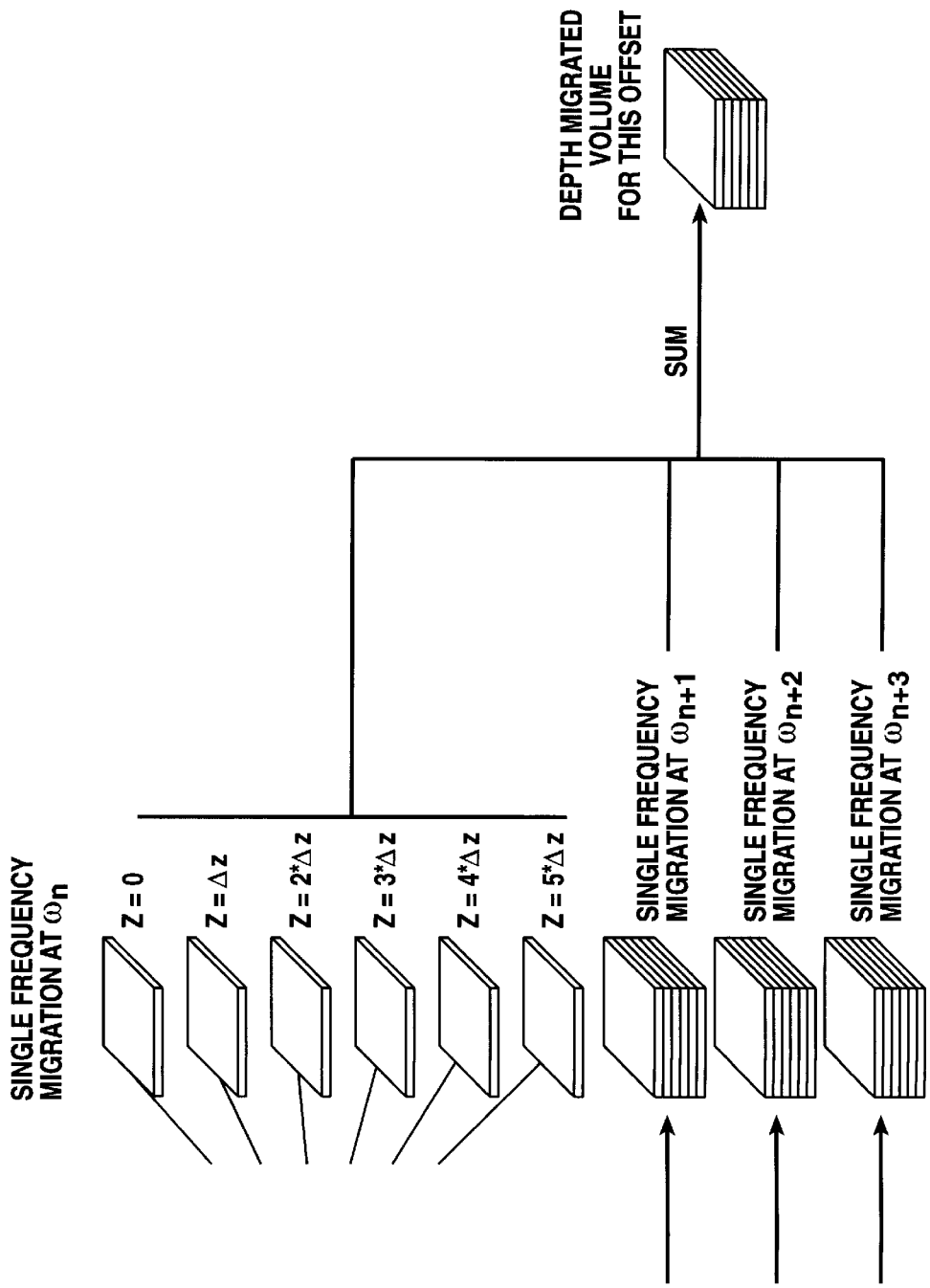

It should be also noted that it is also possible to directly calculate the migration from its definition as a convolution. This operation is broadly illustrated in FIG. 4. Although this would generally be a much less efficient way of performing the migration, it would yield exactly the same end result, at least to the limits of computational accuracy of the computer. Let, $D_1[i,j,\omega]$ represent the 1-D (time direction) Fourier transform of the common offset data volume d[·], the last argument of $D_1[i,j,\omega]$ indicating generally that the units of that index are frequency. Those skilled in the art will recognize that $D_1[·]$ is volume of Fourier transform coefficients and that horizontal slices of $D_1[i,j,k]$ (k fixed) contain coefficients from every trace corresponding to the same Fourier frequency.

If, as described previously, $g_n[·]$ is the migration operator for a V(z) velocity model, the migration of the common offset volume can be computed much as before. First, obtain a suite of single frequency migrated volumes by calculating the 2-D convolution of frequency slices from the data with the migration operator at different depths:

$$SF'_n[i, j, k] = \sum_{m=1}^{N_X} \sum_{p=1}^{N_Y} D_1[m, p, n] g_n[i - m, j - p, k],$$

$$i = 1, N_X, j = 1, N_Y, k = 1, ND,$$

where $g_n[i,j,·]$ is taken to be equal to zero for indices outside of the following defined ranges:

$$\frac{-N_X}{2} \leq i \leq \frac{N_X}{2} - 1, \frac{-N_Y}{2} \leq j \leq \frac{N_Y}{2} - 1.$$

Note that single frequency migrations calculated via direct convolution are different from those calculated previously (hence the "primed" notation) in that their depth slices do not need to be inverse 2-D Fourier transformed to produce the final migration. In more particular, after the single frequency migrations have been calculated, the migrated data volume is simply obtained by summing them together:

$$m[i, j, k] = \sum_{n=1}^{NFREQ} SF'_n[i, j, k]$$

Finally, if the velocity model is an extruded velocity model of the form V(x,z) (or V(y,z)), the approach discussed previously would need to be modified as follows (FIG. 8). First, rather than having a single migration operator volume, there will be a suite of operator volumes, one for each "X" surface position and frequency. As before, a common offset volume would be acquired and processed via a 1-D Fourier transform, thereby creating a collection of Fourier transform coefficient slices. Given a first frequency slice to process, $\omega_n$ in FIG. 8, a collection of migration operator volumes for this frequency would be assembled, each operator volume corresponding to a different X CMP location. Then, a "planar row" of numbers corresponding to the first CMP position ($X_1$) in the common offset volume will be extracted from the frequency slice, where the term "planar row" will be used hereinafter to refer to a one dimensional contiguous collection of numbers from a slice taken in a direction orthogonal to the horizontal coordinate axis along which the velocity is allowed to vary. For a V(x, z) model, the planar rows will be oriented parallel to the "Y" axis. This extracted frequency planar row is then combined with a corresponding migration operator volume calculated for that same CMP location ($X_1$ in this case) by way of a series of 1-D convolutions. In more particular, each depth (or time) slice of the migration operator may be thought of as consisting of a suite of planar rows. For a given depth slice of the migration operator for a CMP, the planar rows that comprise that slice are separately convolved with the frequency planar row to produce an output depth (time) slice. Repeating this operation for every depth slice in the migration operator, produces a new volume of coefficients, a single CMP migration hereinafter. Repeating the previous operation for the remaining CMPs in the frequency slice will produce as many single CMP migrations as there are planar rows in that slice. Finally, summing together all of the single CMP migrations for this frequency produces a composite volume that has been referred to previously as a single frequency migration for that common offset volume.

In terms of equations, a single CMP migration at frequency $\omega_n$, $SCMP_{n,m}[i,j,k]$, for the "mth" CMP and the "nth" frequency slice is preferably written as the following convolution:

$$SCMP_{n,m}[i, j, k] = \sum_{p=1}^{N_Y} D_1[i, j, n] g_{n,m}[i, j - p, k],$$

$$i = 1, N_X, j = 1, N_Y, k = 1, ND$$

where, as before, $g_{n,m}[·]$ is zero for indices outside of their defined range. A single frequency migration is then calculated by summing all of the single CMP migrations:

$$SF'_n[i, j, k] = \sum_{m=1}^{N_X} SCMP_{n,m}[i, j, k], i = 1, N_X, j = 1, N_Y, k = 1, ND,$$

where the "prime" notation indicates that no inverse Fourier transform need be computed for this matrix. In words, the previous equation indicates that each point in the output single frequency migration can be represented as the sum of $N_X$ 1-D convolutions between a planar row in a frequency slice and a corresponding planar row in a depth slice. The migrated common offset volume is then obtained, as before, by summing together some number of these single frequency migrations.

Note that the previous convolutional equation contains only a 1-D convolution calculated in the "Y" direction (the sum over "p"), rather than the 2-D convolution that arose previously when the velocity model was in the form of V(z). Let $G_{n,m}[i,j,k]$ represent the 1-D Fourier transform (in the Y or "planar row" direction) of the migration operator $g_{n,m}[i,j,k]$. Then, a single frequency migration can be calculated by multiplying together the appropriate array elements in $G_{n,m}[\cdot]$ and $D_2[\cdot]$ to calculate the convolution and then summing over all X CMPs:

$$SF_n[i,j,k] = \sum_{m=1}^{N_X} D_2[i,j,n] G_{n,m}[i,j,k]$$

where $D_2[\cdot]$ represents a 2-D Fourier transform of the common offset volume: a transform in the vertical (time) direction and another in the Y direction. The units of $D_2[\cdot]$ are (X distance, Y wavenumber, frequency). As before the single frequency migrations are summed together to form a migrated data volume, which then needs only a series of inverse 1-D Fourier transforms in the planar row direction of each depth slice to produce the final migration of the common offset volume.

In summary, when the velocity model is of the form V(x,z) a prestack migration of a common offset volume may be calculated by computing a series of 1-D convolutions between planar rows in a frequency slice and corresponding migration operator volumes. Because the embedded convolution is only 1-D, the computational speedup obtained by using the Fourier transform to calculate the convolution will more modest than that obtained when the convolution was 2-D. But the resulting decrease in run time can still be significant.

Computational Savings

The decrease in computational effort afforded by the instant technique can be substantial if use is made of the Fourier transform to calculate the convolution. For example, the number of operations that would normally be required to compute a Kirchhoff prestack migration using a conventional approach is roughly equal to $ND \cdot N_X \cdot N_Y \cdot O_X \cdot O_Y \cdot C$, where, $O_X$ and $O_Y$ are the dimensions of the migration operator in the X and Y directions respectively and C is a constant determined by the implementation of the migration operator. Calculating a 3-D prestack migration by the methods disclosed herein would require about $ND \cdot NFREQ \cdot N_X \cdot Log(N_X) \cdot N_Y \cdot Log(N_Y)$ operations, where NFREQ is the number of frequency slices used in the migration and Log(·) represents the natural logarithm. So, whenever $$C \cdot O_X \cdot O_Y > NFREQ \cdot Log(N_X) \cdot Log(N_Y),$$

the instant method will be faster. By way of example, when $N_X = N_Y = 1024$, and $O_X = O_Y = 512$, the instant methods are potentially about 13 C times faster than traditional methods. Depending on the "fidelity" of the migration operator, the value of the constant "C" might be 10 or more, and $O_X$ and $O_Y$ nearer 1024, in which case speed improvements of over a factor of 100 theoretically possible.

Note also that if the velocity model is dependent on one horizontal variable and depth (e.g., V(x,z), the extruded velocity model), the potential speedup might be "only" a factor of 10 or so. Still, a ten-fold decrease in computer run time would allow a conventional migration that required six months to be completed in under three weeks. For velocity models that can be expressed in this form, this is a substantial improvement over the prior art.

All of the operations described above have been presented as though the necessary data volumes could be completely held in computer memory during the migration process. In fact, there are many 3-D surveys that are so large that it is not practical to store the entire unstacked common offset volume (or its 3-D Fourier transform) in memory at one time. In those cases, those skilled in the art will understand that there are a number of ways to get around these memory limitations and calculate the migration generally as it has been described previously, including such strategies as using hard disk as virtual memory, reading the data in pieces, processing one frequency slice at a time, etc.

In the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of additional examples, the same approach described herein could be used to process and/or analyze other sorts of geophysical data including multi-component seismic data, shear wave data, synthetic aperture radar, and side scan sonar to name few. Thus, in the claims that follow, those skilled in the art will understand that "seismic trace" has been used in the broader sense of including any geophysical time series which would profit from processing by a prestack migration.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of performing a prestack migration of seismic data, wherein there is provided a seismic survey consisting of unstacked seismic traces collected over a predetermined volume of the earth, each of said unstacked seismic traces being characterized by at least an offset from a shot, at least a portion of said unstacked seismic traces being organized into at least one common offset volume, and wherein there is provided a horizontally layered velocity model, comprising the steps of:

(a) selecting a common offset volume from said at least one common offset volumes, said selected common offset volume consisting of common offset seismic traces, each of said constant offset seismic traces having a same offset from a shot;

(b) calculating a 1-D time Fourier transform of each of said common offset seismic traces, thereby producing a volume of Fourier transform coefficients, said volume of Fourier transform coefficients consisting of at least one constant frequency slice;

(c) selecting a constant frequency slice from said volume of Fourier transform coefficients, said constant frequency slice containing Fourier transform coefficients corresponding to a single frequency;

(d) obtaining a migration operator volume calculated from said horizontally layered velocity model and said single frequency, said migration operator volume consisting of at least one planar slice;

(e) selecting a planar slice from said migration operator volume;

(f) calculating a 2-D convolution between said selected constant frequency slice and said selected planar slice, thereby creating a single frequency migrated slice;

(g) repeating steps (e) and (f) a predetermined number of times, thereby creating a predetermined number of single frequency migrated slices, said predetermined number of single frequency migrated slices together forming a single frequency migration volume;

(h) repeating steps (c) through (g) a predetermined number of times, thereby creating a predetermined number of single frequency migration volumes; and, (i) summing together said predetermined number of single frequency migration volumes, thereby producing a migrated common offset data volume for use in the geophysical exploration for hydrocarbons within said predetermined volume of the earth.

2. A method according to claim 1, wherein said planar slice of step (d) is a depth slice and wherein said prestack migration is a prestack depth migration.

3. A method according to claim 1, wherein said planar slice of step (d) is a time slice and wherein said prestack migration is a prestack time migration.

4. A method according to claim 1, wherein the step of obtaining a migration operator volume includes the step of calculating a migration operator volume.

5. A method according to claim 4, wherein step (d) includes the steps of:

(d1) obtaining a Green's function time array and a Green's function amplitude array calculated from said horizontally layered velocity model, and, (d2) calculating a migration operator volume from said horizontally layered velocity model, said Green's function time array, said Green's function amplitude array, and said single frequency.

6. A method according to claim 5, wherein step (d1) includes the step of calculating a Green's function time array and a Green's function amplitude array from said horizontally layered velocity model.

7. A method according to claim 1, further including the step of:

(j) displaying at least a portion of said migrated common offset data volume.

8. A method according to claim 1, wherein steps (a) through (i) are repeated for at least two common offset seismic volumes, thereby producing at least two migrated common offset seismic volumes, and wherein each of said at least two migrated common offset seismic volumes consists of at least four migrated common offset seismic traces.

9. A method according to claim 8, wherein each of said migrated common offset seismic traces is associated with a CMP, further including the steps of:

(j) forming a stacked migrated seismic volume from said migrated common offset seismic traces; and, (k) storing said stacked migrated seismic volume.

10. A method according to claim 9, wherein step (j) includes the steps of:

(j1) sorting at least a portion of said migrated common offset seismic traces according to said CMP of each of said migrated common offset seismic traces, thereby forming at least four migrated CMP gathers, and, (j2) stacking at least a portion of said at least four migrated CMP gathers, thereby producing a stacked migrated seismic volume.

11. A method according to claim 9, wherein the step of storing said stacked migrated seismic volume includes the step of storing said stacked migrated seismic volume in computer RAM.

12. A method according to claim 9, further including the step of:

(l) displaying at least a portion of said stacked migrated seismic volume.

13. A method according to claim 12, wherein the step of displaying at least a portion of said stacked migrated seismic volume includes the further step of recording visually perceptible images representative of said stacked migrated seismic volume on a generally flat medium.

14. A method according to claim 13, wherein said generally flat medium includes a computer monitor.

15. A method for the exploration of hydrocarbons, wherein a stored stacked migrated seismic volume has been prepared by the method of claim 9, comprising the steps of:

(a) accessing said stored stacked migrated seismic volume; and, (b) displaying at least a portion of said stored stacked migrated seismic volume.

16. A method according to claim 15, wherein the step of displaying at least a portion of said stored stacked migrated seismic volume includes the step of displaying at least a portion of said stored stacked migrated seismic volume on a computer monitor.

17. A method according to claim 1, wherein step (f) includes the steps of:

(f1) calculating a 2-D Fourier transform of said constant frequency slice, thereby producing a slice of 3-D Fourier frequency coefficients, (f2) calculating a 2-D Fourier transform of said planar slice from said migration operator volume, thereby producing a slice of 2-D Fourier operator coefficients, (f3) multiplying together, coefficient-by-coefficient, said slice of 3-D Fourier frequency coefficients and said slice of 2-D Fourier operator coefficients, thereby producing a frequency domain 2-D convolution, and, (f4) calculating an inverse 2-D Fourier transform of said product slice, thereby producing a 2-D convolution between said selected constant frequency slice and said selected planar slice.

18. In a digital computer wherein there is provided at least one volume of Fourier transform coefficients obtained by computing a 1-D time Fourier transform of at least one common offset seismic volume, each of said at least one common offset seismic volumes consisting of unstacked seismic traces obtained from a seismic survey conducted over a predetermined volume of the earth, each of said unstacked seismic traces being characterized by at least a CMP gather number and a distance from a shot, each of said unstacked seismic traces in a same common offset seismic volume corresponding to a same offset from a shot, and, each of said unstacked seismic traces in said same common offset seismic volume containing information representative of at least a part of the subsurface structure and stratigraphy within said predetermined volume of the earth, each of said at least one volumes of Fourier transform coefficients consisting of at least one constant frequency slice, each of said at least one constant frequency slices containing Fourier transform coefficients corresponding to a single Fourier frequency, and wherein there is provided a horizontally layered velocity model, a digital computer programmed to perform a method of prestack seismic migration for use in the seismic exploration for hydrocarbons within said predetermined volume of the subsurface, comprising the steps of:

(a) selecting a volume of Fourier transform coefficients from said at least one volumes of Fourier transform coefficients;

(b) selecting a constant frequency slice from said selected volume of Fourier transform coefficients, said selected constant frequency slice consisting of a 2-D numerical array of Fourier coefficients corresponding to a single frequency;

(c) obtaining a matching migration operator volume calculated from said horizontally layered model and said single frequency, said matching migration operator volume consisting of at least one planar slice;

(d) selecting a planar slice from said matching migration operator volume, said selected planar slice consisting of a 2-D array of numerical operator values;

(e) calculating a 2-D convolution between said 2-D numerical array of Fourier coefficients and said 2-D array of numerical operator values, thereby creating a single frequency migrated 2-D slice;

(f) repeating steps (d) and (e) a predetermined number of times, thereby creating a predetermined number of single frequency migrated 2-D slices, said predetermined number of single frequency migrated 2-D slices together forming a single frequency migration volume;

(g) repeating steps (b) through (f) a predetermined number of times, thereby creating a predetermined number of single frequency migration volumes; and, (h) summing together said predetermined number of single frequency migration volumes, thereby producing a migrated common offset seismic volume containing enhanced information representative of at least a part of said predetermined volume of the subsurface of the earth.

19. A method according to claim 18, wherein said planar slice of step (d) is a depth slice and where said prestack migration is a prestack depth migration.

20. A method according to claim 18, wherein said planar slice of step (d) is a time slice and where said prestack migration is a prestack time migration.

21. A method according to claim 18, wherein steps (a) through (h) are repeated for at least two selected volumes of Fourier transform coefficients, thereby producing at least two migrated common offset seismic volumes, each of said migrated common offset seismic volumes consisting of at least four migrated common offset seismic traces, and each of said migrated common offset seismic traces corresponding to a CMP gather number.

22. A method according to claim 21, further including the steps of:

(i) forming a stacked migrated seismic volume from said migrated common offset seismic traces; and, (j) storing said stacked migrated seismic volume.

23. A method according to claim 22, wherein step (i) includes the steps of:

(i1) forming at least four migrated CMP gathers by sorting at least a portion of said migrated common offset seismic traces according to each migrated common offset seismic traces' associated CMP gather number, and, (i2) stacking at least a portion of said at least four migrated CMP gathers, thereby producing a stacked migrated seismic volume.

24. A method according to claim 22, further including the step of:

(k) displaying at least a portion of said stored stacked migrated seismic volume.

25. A method according to claim 24, wherein the step of displaying at least a portion of said stacked migrated seismic volume includes the further step of recording visually perceptible images representative of said stacked migrated seismic volume on a generally flat medium.

26. A method for the exploration of hydrocarbons within at least a part of said predetermined volume of the subsurface of the earth, wherein a stacked migrated seismic volume has been prepared by the method of claim 22, comprising the steps of:

(a) accessing at least a portion of said stored stacked migrated seismic volume; and, (b) displaying said accessed portion of said stored stacked migrated seismic volume.

27. A device adapted for use by a digital computer wherein a plurality of computer instructions defining the method of claim 18, are encoded, said device being readable by said digital computer, and said computer instructions programming said computer to perform said method.

28. The device of claim 27, wherein said device is selected from the group consisting of a magnetic tape, a magnetic disk, a magneto-optical disk, an optical disk and a CD-ROM.

29. A method according to claim 18, wherein said common offset seismic volume consists of at least four common offset seismic traces, wherein there are a predetermined number of in-line common offset seismic traces and a predetermined number of cross-line seismic traces, and, wherein said migrated common offset seismic volume of step (h) is computed according to the formula $$m[i,j,k] = \sum_{n=1}^{NFREQ} SF_n[i,j,k]$$

$$i = 1, N_X, j = 1, N_Y, k = 1, ND,$$

where m[i,j,k] is an element in said migrated common offset data volume, $SF_n[i,j,k]$ is an element in one of said predetermined number of single frequency migration volumes, $N_X$ represents said predetermined number of in-line seismic traces in said common offset seismic volume, $N_Y$ represents said predetermined number of cross-line traces, ND represents said predetermined number of single frequency migrated depth slices so calculated, and NFREQ represents said predetermined number of single frequency migrations so calculated.

30. In a digital computer wherein there is provided at least one volume of Fourier transform coefficients obtained by computing a 1-D time Fourier transform of a common offset seismic volume and by computing a 2-D horizontal Fourier transform of at least a portion of said common offset seismic volume, each of said at least one common offset seismic volumes consisting of unstacked seismic traces obtained from a seismic survey conducted over a predetermined volume of the earth, each of said unstacked seismic traces being characterized by at least a CMP gather number and a distance from a shot, each of said unstacked seismic traces in a same common offset seismic volume corresponding to a same offset from a shot, and, each of said unstacked seismic traces in said same common offset seismic volume containing information representative of at least a part of the subsurface structure and stratigraphy within said predetermined volume of the earth, each of said at least one volumes of Fourier transform coefficients consisting of at least one constant frequency slice, each of said at least one constant frequency slices containing Fourier transform coefficients corresponding to a single Fourier frequency, and wherein there is provided a horizontally layered velocity model, a digital computer programmed to perform a method of prestack seismic migration for use in the seismic exploration for hydrocarbons within said predetermined volume of the subsurface, comprising the steps of:

(a) selecting a volume of Fourier transform coefficients from said at least one volumes of Fourier transform coefficients;

(b) selecting a constant frequency slice from said selected volume of Fourier transform coefficients, said constant frequency slice consisting of a 2-D numerical array of Fourier coefficients corresponding to a single frequency;

(c) obtaining a matching migration operator volume calculated from said horizontally layered model and said single frequency, said matching migration operator volume consisting of at least one planar slice;

(d) obtaining a 2-D Fourier transform of a selected planar slice from said matching migration operator volume, said 2-D Fourier transform of said selected planar slice consisting of a 2-D numerical array of Fourier transformed numerical operator values;

(e) multiplying together term-by-term said 2-D numerical array of Fourier coefficients corresponding to a single frequency and said 2-D numerical array of Fourier transformed numerical operator values, thereby producing a product slice;

(f) repeating steps (d) and (e) a predetermined number of times, thereby creating a predetermined number of product slices, said predetermined number of product slices together forming a single frequency migration volume;

(g) repeating steps (b) through (f) a predetermined number of times, thereby creating a predetermined number of single frequency migration volumes;

(h) summing together said predetermined number of single frequency migration volumes, thereby forming a summed volume, said summed volume consisting of at least one summed horizontal slice; and, (i) calculating an inverse 2-D Fourier transform of at least one of said summed horizontal slices, thereby producing a migrated common offset seismic volume containing information representative of at least a part of said predetermined volume of the subsurface of the earth.

31. A method according to claim 30, wherein steps (a) through (i) are repeated for at least two common offset seismic volumes, thereby producing at least two migrated common offset seismic volumes, and wherein each of said at least two migrated common offset seismic volumes consists of at least four migrated common offset seismic traces.

32. A method according to claim 31, wherein each of said migrated common offset seismic traces is associated with a CMP, further including the steps of:

(j) forming a stacked migrated seismic volume from said migrated common offset seismic traces; and, (k) storing said stacked migrated seismic volume.

33. A method for the exploration of hydrocarbons, wherein a stored stacked migrated seismic volume has been prepared by the method of claim 32, comprising the steps of:

(a) accessing said stored stacked migrated seismic volume; and, (b) displaying at least a portion of said stored stacked migrated seismic volume.

34. A method according to claim 33, wherein the step of displaying at least a portion of said stored stacked migrated seismic volume includes the step of displaying at least a portion of said stored stacked migrated seismic volume on a computer monitor.

35. A method of performing a prestack migration of seismic data, wherein there is provided a seismic survey consisting of unstacked seismic traces collected over a predetermined volume of the earth, each of said unstacked seismic traces being characterized by at least an offset from a shot, at least a portion of said unstacked seismic traces being organized into at least one common offset volume, and wherein there is provided a horizontally layered velocity model, comprising the steps of:

(a) selecting a common offset volume from said at least one common offset volume, said selected common offset volume consisting of common offset seismic traces, each of said constant offset seismic traces having a same offset from a shot, said selected common offset volume containing a predetermined number of in-line common offset seismic traces and a predetermined number of cross-line common offset seismic traces;

(b) obtaining a 3-D Fourier transform of said common offset seismic volume, thereby producing a volume of 3-D Fourier transform coefficients, said volume of 3-D Fourier transform coefficients consisting of at least one constant frequency slice;

(c) selecting a constant frequency slice from said volume of 3-D Fourier transform coefficients, said constant frequency slice containing 3-D Fourier transform coefficients corresponding to a single frequency;

(d) obtaining a migration operator volume calculated from said horizontally layered velocity model and said single frequency, said migration operator volume consisting of at least one planar slice;

(e) selecting a planar slice from said migration operator volume;

(f) calculating a 2-D Fourier transform of said planar slice from said migration operator, thereby producing a slice of 2-D Fourier operator coefficients;

(g) multiplying together, coefficient-by-coefficient, said slice of 3-D Fourier frequency coefficients and said slice of 2-D Fourier operator coefficients, thereby producing a product slice;

(h) repeating steps (e) through (g) a predetermined number of times, thereby creating a predetermined number of product slices, said predetermined number of product slices together forming a single frequency migration volume;

(i) repeating steps (c) through (h) a predetermined number of times, thereby creating a predetermined number of single frequency migration volumes;

(j) summing together said predetermined number of single frequency migration volumes to form a summed volume, said summed volume consisting of at least one summed horizontal slice; and, (k) calculating an inverse 2-D Fourier transform of each of said summed horizontal slices, thereby producing a migrated common offset data volume for use in the geophysical exploration for hydrocarbons within said predetermined volume of the earth.

36. A method according to claim 35, wherein the step of multiplying together element-by-element said transformed frequency slice matrix elements and said transformed depth slice matrix elements, thereby producing a product depth slice, is computed according to the following formula:

$$SF_n[i,j,m]=D[i,j,n] \cdot G[i,j,m], \ i=1, N_X, j=1, N_Y,$$

where $SF_n[i,j,m]$ represents an element in said at least four product depth slices for depth slice m and frequency slice n, $D[i,j,n]$ represents an element in said at least four transformed frequency slice matrix elements, $G[i,j,m]$ represents an element in said at least four transformed depth slice matrix elements, $N_X$ represents said predetermined number of in-line traces and $N_Y$ represents said predetermined number of cross line traces in said common offset volume.

37. The method of claim 35, wherein at least steps (c) through (k) are digitally encoded as a set of instructions for programming a computer and further including the step of loading said instructions on said computer before performing steps (c) through (k).

38. A device adapted for use by a digital computer wherein a plurality of computer instructions defining the method of claim 37 are encoded, said device being readable by said digital computer, and said computer instructions programming said computer to perform said method.

39. The device of claim 38, wherein said device is selected from the group consisting of a magnetic tape, a magnetic disk, a magneto-optical disk, an optical disk and a CD-ROM.

40. In a digital computer wherein there is provided a volume of Fourier transform coefficients obtained by computing a 1-D time Fourier transform of a common offset seismic volume, said common offset seismic volume containing information representative of the subsurface structure and stratigraphy of at least a part of a predetermined volume of the subsurface of the earth, said volume of Fourier transform coefficients consisting of at least one constant frequency slice, each of said at least one constant frequency slices consisting of Fourier transform coefficients corresponding to a single Fourier frequency, and wherein there is provided an extruded velocity model, a digital computer programmed to perform a method of prestack seismic migration for use in the seismic exploration for hydrocarbons within said predetermined volume of the subsurface, comprising the steps of:

(a) selecting a constant frequency slice from said volume of Fourier transform coefficients, said selected constant frequency slice consisting of at least two planar rows of Fourier transform coefficients, said Fourier transform coefficients all corresponding to a single frequency;

(b) selecting a planar row of Fourier transform coefficients from said selected constant frequency slice, said selected planar row of Fourier transform coefficients corresponding to a CMP location on the surface of the earth;

(c) obtaining a matching migration operator volume calculated from said extruded velocity model, said single frequency, and said CMP location on the surface of the earth, said matching migration operator volume consisting of at least one planar slice, each of said at least one planar slices consisting of at least two planar rows of operator coefficients;

(d) selecting a planar slice from said matching migration operator volume;

(e) selecting a planar row of operator coefficients from said selected planar slice;

(f) calculating a 1-D convolution between said planar row of Fourier transform coefficients and said planar row of operator coefficients, thereby forming a planar migrated row;

(g) repeating steps (e) and (f) a predetermined number of times, thereby forming a predetermined number of planar migrated rows, said predetermined number of planar migrated rows together forming a single CMP migrated slice;

(h) repeating steps (d) through (g) a predetermined number of times, thereby forming a predetermined number of single CMP migrated slices, said predetermined number of single CMP migrated slices together forming a single CMP migrated volume;

(i) repeating steps (b) through (h) a predetermined number of times, thereby forming a predetermined number of single CMP migrated volumes;

(j) summing together said predetermined number of single CMP migrated volumes, thereby forming a single frequency migrated volume;

(k) repeating steps (a) through (j) a predetermined number of times, thereby creating a predetermined number of single frequency migrated volumes; and, (l) summing together said predetermined number of single frequency migrated volumes, thereby producing a migrated common offset seismic volume containing enhanced information representative of at least a part of said predetermined volume of the subsurface of the earth.

41. A method according to claim 40, wherein steps (a) through (l) are repeated for at least two common offset seismic volumes, thereby producing at least two migrated common offset seismic volumes, each of said migrated common offset seismic volumes consisting of at least four migrated common offset seismic traces, and each of said migrated common offset seismic traces corresponding to a CMP gather number.

42. A method according to claim 41, further including the steps of:

(m) forming a stacked migrated seismic volume from said migrated common offset seismic traces; and, (n) storing said stacked migrated seismic volume.

43. A method according to claim 42, wherein step (m) includes the steps of:

(m1) forming at least four migrated CMP gathers by sorting at least a portion of said migrated common offset seismic traces according to each migrated common offset seismic traces' associated CMP gather number, and, (m2) stacking at least a portion of said at least four migrated CMP gathers, thereby producing a stacked migrated seismic volume.

44. A method according to claim 42, further including the step of:

(o) displaying at least a portion of said stored stacked migrated seismic volume.

45. A method according to claim 44, wherein the step of displaying at least a portion of said stacked migrated seismic volume includes the further step of recording visually perceptible images representative of said stacked migrated seismic volume on a generally flat medium.

46. A method for the exploration of hydrocarbons within at least a part of said predetermined volume of the subsurface of the earth, wherein a stacked migrated seismic volume has been prepared by the method of claim 42, comprising the steps of:

(a) accessing at least a portion of said stored stacked migrated seismic volume; and, (b) displaying said accessed portion of said stored stacked migrated seismic volume.

47. A device adapted for use by a digital computer wherein a plurality of computer instructions defining the method of claim 40, are encoded, said device being readable by said digital computer, and said computer instructions programming said computer to perform said method.

48. The device of claim 47, wherein said device is selected from the group consisting of a magnetic tape, a magnetic disk, a magneto-optical disk, an optical disk and a CD-ROM.

49. A method according to claim 40, wherein said planar slice of step (c) is a depth slice and where said prestack migration is a depth migration.

50. A method according to claim 40, wherein said planar slice of step (c) is a time slice and where said prestack migration is a time migration.

51. A method of performing a prestack migration of common offset seismic data, wherein there is provided a seismic survey consisting of unstacked seismic traces collected over a predetermined volume of the earth, each of said unstacked seismic traces being characterized by at least an offset from a shot, and containing information representative of subsurface structural and stratigraphic features within said predetermined volume of the earth, wherein at least a portion of said unstacked seismic traces are organized into at least one common offset volume, and wherein there is provided a horizontally layered velocity model, comprising the steps of:

(a) selecting a common offset seismic volume from said at least one common offset volumes, said selected common offset seismic volume consisting of common offset seismic traces all having a same offset;

(b) obtaining a 1-D time Fourier transform of each of said common offset seismic traces, thereby producing a 1-D time Fourier transform of said selected common offset seismic volume;

(c) obtaining a migration operator calculated from said horizontally layered velocity model; and, (d) calculating a prestack migration of said selected common offset seismic volume, thereby producing a migrated common offset seismic volume for use in the exploration for hydrocarbons within said predetermined volume of the earth, said migrated common offset seismic volume (d1) consisting of a plurality of image points, (d2) being calculated over a range of frequencies, said range of frequencies being bounded below by a minimum frequency and being bounded above by a maximum frequency, (d3) being calculated over a range of in-line surface locations, said range of in-line surface locations being bounded below by a minimum in-line surface location and being bounded above by a maximum in-line surface location, and (d4) being calculated over a range of cross-line surface locations, said range of cross-line surface locations being bounded below by a minimum cross-line surface location and being bounded above by a maximum cross-line surface location, said calculation being performed according to the following formula, $$m_{CO}(x, y, z) = \int_{\omega_{min}}^{\omega_{max}} d\omega$$

$$\int_{x_{min}}^{x_{max}} dx' \int_{y_{min}}^{y_{max}} dy' g(x-x', y-y', z, \omega, h_X, h_Y) d_{CO}(x', y', \omega)$$

where $d_{CO}(x',y',\omega)$ represents said 1-D time Fourier transform of said selected common offset seismic volume, $g(x-x', y-y', z, \omega, h_X, h_Y)$ represents said migration operator, $m_{CO}(x,y,z)$ represents an image point at a location (x,y,z) within said migrated common offset seismic volume, $\omega_{min}$ represents said minimum frequency, $\omega_{max}$ represents said maximum frequency, $x_{min}$ represents said minimum in-line surface location, $x_{max}$ represents said maximum in-line surface location, $y_{min}$ represents said minimum cross-line surface location, $y_{max}$ represents said maximum cross-line surface location, and where $\omega$, x', and y' are variables of integration.

52. A method according to claim 51, wherein at least step (d) is implemented numerically as a computer program within a digital computer, said computer program consisting of a set of instructions for programming said digital computer, and further including the step of loading said instructions on said digital computer before performing said at least step (d).

53. A device adapted for use by a digital computer wherein a plurality of computer instructions defining the method of claim 52, are encoded, said device being readable by said digital computer, and said computer instructions programming said computer to perform said method.

54. The device of claim 53, wherein said device is selected from the group consisting of a magnetic tape, a magnetic disk, a magneto-optical disk, an optical disk and a CD-ROM.

55. A method of calculating a 2-D Fourier transform of a prestack migration of common offset seismic data, wherein there is provided a seismic survey consisting of unstacked seismic traces collected over a predetermined volume of the earth, each of said unstacked seismic traces being characterized by at least an offset from a shot, containing information representative of subsurface structural and stratigraphic features within said predetermined volume of the earth, wherein at least a portion of said unstacked seismic traces are organized into at least one common offset volume, and wherein there is provided a horizontally layered velocity model, comprising the steps of:

(a) selecting a common offset seismic volume from said at least one common offset volumes, said selected common offset seismic volume consisting of common offset seismic traces all having a same offset;

(b) obtaining a 3-D Fourier transform of said selected common offset seismic volume;

(c) obtaining a migration operator calculated from said horizontally layered velocity model;

(d) obtaining a 2-D horizontal Fourier transform of said migration operator; and, (e) calculating a prestack migration of said 3-D transform of said selected common offset seismic volume, thereby producing a 2-D Fourier transform of a migrated common offset seismic volume for use in the exploration for hydrocarbons within said predetermined volume of the earth, said 2-D Fourier transform of a migrated common offset seismic volume (e1) consisting of a plurality of image points, (e2) being calculated over a range of frequencies, said range of frequencies being bounded below by a minimum frequency and being bounded above by a maximum frequency, said calculation being performed according to the following formula, $$M_{CO}(k_X, k_Y, z) = \int_{\omega_{min}}^{\omega_{max}} d\omega G(k_X, k_Y, z, \omega, h_X, h_Y) D_{CO}(k_X, k_Y, \omega).$$

where $D_{CO}(k_X, k_Y, \omega)$ represents said 3-D Fourier transform of said selected common offset seismic volume, $G(k_X, k_Y, z, \omega, h_X, h_Y)$ represents said 2-D horizontal Fourier transform of said migration operator, $M_{CO}(k_X, k_Y, z)$ represents an image point at a location $(k_X, k_Y, z)$ within said 2-D Fourier transformed migrated common offset seismic volume, $\omega_{min}$ represents said minimum frequency, $\omega_{max}$, and where $\omega$ is a variables of integration.

56. A method according to claim 55, including the further step of:

(f) calculating an inverse 2-D Fourier transform of said 2-D Fourier transformed migrated common offset seismic volume, thereby producing a migrated common offset seismic volume for use in the exploration for hydrocarbons within said predetermined volume of the earth.

57. A method according to claim 55, wherein at least step (e) is implemented numerically as a computer program within a digital computer, said computer program consisting of a set of instructions for programming said digital computer, and further including the step of loading said instructions on said digital computer before performing said at least step (e).

58. A device adapted for use by a digital computer wherein a plurality of computer instructions defining the method of claim 57, are encoded, said device being readable by said digital computer, and said computer instructions programming said computer to perform said method.

59. The device of claim 58, wherein said device is selected from the group consisting of a magnetic tape, a magnetic disk, a magneto-optical disk, an optical disk and a CD-ROM.

60. A method of performing a prestack migration of common offset seismic data, wherein there is provided a seismic survey consisting of unstacked seismic traces collected over a predetermined volume of the earth, each of said unstacked seismic traces being characterized by at least an offset from a shot, containing information representative of subsurface structural and stratigraphic features within said predetermined volume of the earth, wherein at least a portion of said unstacked seismic traces are organized into at least one common offset volume, and wherein there is provided a horizontally layered velocity model, comprising the steps of:

(a) selecting a common offset seismic volume from said at least one common offset volumes, said selected common offset seismic volume consisting of common offset seismic traces all having a same offset;

(b) obtaining a 3-D Fourier transform of said selected common offset seismic volume;

(c) obtaining a 2-D horizontal Fourier transform of a migration operator calculated from said horizontally layered velocity model; and, (d) calculating a prestack migration of said selected common offset seismic volume, thereby producing a migrated common offset seismic volume for use in the exploration for hydrocarbons within said predetermined volume of the earth, said migrated common offset seismic volume (d1) consisting of a plurality of image points, (d2) being calculated over a range of frequencies, said range of frequencies being bounded below by a minimum frequency and being bounded above by a maximum frequency, (d3) being calculated over a range of in-line wave numbers, said range of in-line wave numbers being bounded below by a minimum in-line wave number and being bounded above by a maximum wave number, and (d4) being calculated over a range of cross-line wave numbers, said range of cross-line wave numbers being bounded below by a minimum wave number and being bounded above by a maximum wave number, said calculation being performed according to the following formula, $$m_{CO}(x, y, z) = \frac{1}{4\pi^2} \int_{\min(k_X)}^{\max(k_X)} dk_X \int_{\min(k_Y)}^{\max(k_Y)} dk_Y \int_{\omega_{min}}^{\omega_{max}} d\omega\, G(k_X, k_Y, z, \omega, h_X, h_Y) D_{CO}(k_X, k_Y, \omega) e^{-ik_X x} e^{-ik_Y y},$$

where $D_{CO}(k_X, k_Y, \omega)$ represents said 3-D Fourier transform of said selected common offset seismic volume, $G(k_X, k_Y, z, \omega, h_X, h_Y)$ represents said migration operator, $m_{CO}(x,y,z)$ represents an image point at a location $(x,y,z)$ within said migrated common offset seismic volume, $\omega_{min}$ represents said minimum frequency, $\omega_{max}$ represents said maximum frequency, $\min(k_X)$ represents said minimum in-line wave number, $\max(k_X)$ represents said maximum in-line wave number, $\min(k_Y)$ represents said minimum cross-line wave number, $\max(k_Y)$ represents said maximum cross-line wave number, and where $\omega$, $k_X$, and $k_Y$ are variables of integration.

61. A method according to claim 60, wherein at least step (d) is implemented numerically as a computer program within a digital computer, said computer program consisting of a set of instructions for programming said digital computer, and further including the step of loading said instructions on said digital computer before performing said at least step (d).

62. A device adapted for use by a digital computer wherein a plurality of computer instructions defining the method of claim 61, are encoded, said device being readable by said digital computer, and said computer instructions programming said computer to perform said method.

63. The device of claim 62, wherein said device is selected from the group consisting of a magnetic tape, a magnetic disk, a magneto-optical disk, an optical disk and a CD-ROM.

64. A method of performing a prestack migration of common offset seismic data, wherein there is provided a seismic survey consisting of unstacked seismic traces collected over a predetermined volume of the earth, each of said unstacked seismic traces being characterized by at least an offset from a shot, containing information representative of subsurface structural and stratigraphic features within said predetermined volume of the earth, wherein at least a portion of said unstacked seismic traces are organized into at least one common offset volume, and wherein there is provided a V(x,z) extruded velocity model, comprising the steps of:

(a) selecting a common offset seismic volume from said at least one common offset volumes, said selected common offset seismic volume consisting of common offset seismic traces all having a same offset;

(b) obtaining a 1-D time Fourier transform of each of said common offset seismic traces, thereby producing a 1-D time Fourier transform of said selected common offset seismic volume;

(c) obtaining a migration operator calculated from said V(x,z) velocity model; and, (d) calculating a prestack migration of said selected common offset seismic volume, thereby producing a migrated common offset seismic volume for use in the exploration for hydrocarbons within said predetermined volume of the earth, said migrated common offset seismic volume (d1) consisting of a plurality of image points, (d2) being calculated over a range of frequencies, said range of frequencies being bounded below by a minimum frequency and being bounded above by a maximum frequency, (d3) being calculated over a range of in-line surface locations, said range of in-line surface locations being bounded below by a minimum in-line surface location and being bounded above by a maximum in-line surface location, and (d4) being calculated over a range of cross-line surface locations, said range of cross-line surface locations being bounded below by a minimum cross-line surface location and being bounded above by a maximum cross-line surface location, said calculation being performed according to the following formula, $$m_{CO}(x, y, z) = \int_{\omega_{min}}^{\omega_{max}} d\omega \int_{x_{min}}^{x_{max}} dx' \int_{y_{min}}^{y_{max}} dy' g(x, x', y - y', z, \omega, h_X, h_Y) d_{CO}(x', y', \omega),$$

where $d_{CO}(x',y',\omega)$ represents said 1-D time Fourier transform of said selected common offset seismic volume, $g(x, x', y-y', z, \omega, h_X, h_Y)$ represents said migration operator, $m_{CO}(x,y,z)$ represents an image point at a location $(x,y,z)$ within said migrated common offset seismic volume, $\omega_{min}$ represents said minimum frequency, $\omega_{max}$ represents said maximum frequency, $x_{min}$ represents said minimum in-line surface location, $x_{max}$ represents said maximum in-line surface location, $y_{min}$ represents said minimum cross-line surface location, $y_{max}$ represents said maximum cross-line surface location, and where $\omega$, $x'$, and $y'$ are variables of integration.

65. A method according to claim 64, wherein at least step (d) is implemented numerically as a computer program within a digital computer, said computer program consisting of a set of instructions for programming said digital computer, and further including the step of loading said instructions on said digital computer before performing said at least step (d).

66. A device adapted for use by a digital computer wherein a plurality of computer instructions defining the method of claim 65, are encoded, said device being readable by said digital computer, and said computer instructions programming said computer to perform said method.

67. The device of claim 66, wherein said device is selected from the group consisting of a magnetic tape, a magnetic disk, a magneto-optical disk, an optical disk and a CD-ROM.

68. A method of performing a prestack migration of common offset seismic data, wherein there is provided a seismic survey consisting of unstacked seismic traces collected over a predetermined volume of the earth, each of said unstacked seismic traces being characterized by at least an offset from a shot, containing information representative of subsurface structural and stratigraphic features within said predetermined volume of the earth, wherein at least a portion of said unstacked seismic traces are organized into at least one common offset volume, and wherein there is provided a V(x,z) extruded velocity model, comprising the steps of:

(a) selecting a common offset seismic volume from said at least one common offset volumes, said selected common offset seismic volume consisting of common offset seismic traces all having a same offset;

(b) calculating a 1-D time Fourier transform of each of said common offset seismic traces, thereby producing a 1-D time Fourier transform volume of said selected common offset seismic volume;

(c) calculating a 1-D cross-line Fourier transform of said 1-D time Fourier transform volume, thereby producing a 2-D Fourier transform of said selected common offset seismic volume;

(d) obtaining a migration operator volume calculated from said V(x,z) velocity model;

(e) calculating a 1-D cross-line Fourier transform of said migration operator, thereby producing a transformed migration operator volume;

(f) calculating a prestack migration of said selected common offset seismic volume, thereby producing a migrated common offset seismic volume for use in the exploration for hydrocarbons within said predetermined volume of the earth, said migrated common offset seismic volume (f1) consisting of a plurality of image points, (f2) being calculated over a range of frequencies, said range of frequencies being bounded below by a minimum frequency and being bounded above by a maximum frequency, (f3) being calculated over a range of cross-line wave numbers, said range of cross-line wave numbers being bounded below by a minimum cross-line wave number and being bounded above by a maximum cross-line wave number, and (f4) being calculated over a range of in-line surface locations, said range of in-line surface locations being bounded below by a minimum in-line surface location and being bounded above by a maximum in-line surface location, said calculation being performed according to the following formula, $$m_{CO}(x, y, z) = \frac{1}{2\pi} \int_{\min(k_Y)}^{\max(k_Y)} dk_Y \int_{\omega_{\min}}^{\omega_{\max}} d\omega$$
$$\int_{x_{\min}}^{x_{\max}} dx' G^Y(x, x', k_Y, z, \omega, h_X, h_Y) D_{CO}^Y(x', k_Y, \omega) e^{-ik_Y y},$$

where $D_{CO}^Y(x', k_Y, \omega)$ represents said 2-D Fourier transform of said selected common offset seismic volume, $G^Y(x, x', k_Y, z, \omega, h_X, h_Y)$ represents said transformed migration migration operator, $m_{CO}(x,y,z)$ represents an image point at a location (x,y,z) within said migrated common offset seismic volume, $\omega_{min}$ represents said minimum frequency, $\omega_{max}$ represents said maximum frequency, $x_{min}$ represents said minimum in-line surface location, $x_{max}$ represents said maximum in-line surface location, $\min(k_Y)$ represents said minimum cross-line wave number, $\max(k_Y)$ represents said maximum cross-line wave number, and where $\omega$, x', and $k_Y$ are variables of integration.

69. A method according to claim 68, wherein at least step (f) is implemented numerically as a computer program within a digital computer, said computer program consisting of a set of instructions for programming said digital computer, and further including the step of loading said instructions on said digital computer before performing said at least step (f).

70. A device adapted for use by a digital computer wherein a plurality of computer instructions defining the method of claim 69, are encoded, said device being readable by said digital computer, and said computer instructions programming said computer to perform said method.

71. The device of claim 70, wherein said device is selected from the group consisting of a magnetic tape, a magnetic disk, a magneto-optical disk, an optical disk and a CD-ROM.

72. A method according to claim 68, wherein steps (a) through (f) are repeated for at least two common offset seismic volumes, thereby producing at least two migrated common offset seismic volumes, and wherein each of said at least two migrated common offset seismic volumes consists of at least four migrated common offset seismic traces.

73. A method according to claim 72, wherein each of said migrated common offset seismic traces is associated with a CMP, further including the steps of:

(g) forming a stacked migrated seismic volume from said migrated common offset seismic traces; and, (h) storing said stacked migrated seismic volume.

74. A method for the exploration of hydrocarbons, wherein a stored stacked migrated seismic volume has been prepared by the method of claim 73, comprising the steps of:

(a) accessing said stored stacked migrated seismic volume; and, (b) displaying at least a portion of said stored stacked migrated seismic volume.

75. A method according to claim 74, wherein the step of displaying at least a portion of said stored stacked migrated seismic volume includes the step of displaying at least a portion of said stored stacked migrated seismic volume on a computer monitor.

* * * * *

UNITED STATES PATENT AND TRADEMARK OFFICE
CERTIFICATE OF CORRECTION

PATENT NO. : 6,049,759
DATED : April 11, 2000
INVENTOR(S) : John T. Etgen

It is certified that error appears in the above-identified patent and that said Letters Patent is hereby corrected as shown below:

Column 1,
Line 51,"A modem seismic trace" should read -- A modern seismic trace --

Column 4,
Line 15, "can be used migrate" should read -- can be used to migrate --
Line 33,"this sort of models being" should read -- this sort of model being --

Column 6,
Line 57, "As is well know to" should read -- As is well known to --

Column 7,
Lines 1-2, "and horizonal units" should read -- and horizontal units --

Column 13,
Line 11, "in the horizonal dimensions." should read -- in the horizontal dimensions. --
Lines 11-12, "In words, the foregoing" should read -- In other words, the foregoing --
Line 17, "well know property"should read -- well known property --
Line 58, "model is V(x,z) is:" should read -- model V(x,z) is: --

Column 16,
Lines 17-18, "tend to much be less" should read -- tend to be much less --
Line 49, "is horizontal sum of all" should read -- is the horizontal sum of all --

Column 18,
Line 29, "GA[ij,k,w]" should read -- GA[i,j,k,w] --
Line 51, "turns upward or until reaches" should read -- turns upward or reaches --

Column 20,
Line 7, "are well know to those" should read -- are well known to those --
Line 42, "Let $g_n$[ij,k]" should read -- Let $g_n$[i,j,k] --
Line 50, "assume, that the in-line": should read -- assume that the in-line --

UNITED STATES PATENT AND TRADEMARK OFFICE
CERTIFICATE OF CORRECTION

PATENT NO. : 6,049,759
DATED : April 11, 2000
INVENTOR(S) : John T. Etgen

It is certified that error appears in the above-identified patent and that said Letters Patent is hereby corrected as shown below:

Column 22,
Lines 20-21, "then be quickly used to quickly construct" should read -- then be used to quickly construct --

Column 23,
Line 26, "slices of the of the migration" should read -- slices of the migration --

Column 24,
Line 11, "$G_n[ij,m]$." should read -- $G_n[i,j,m]$. --

Column 26,
Line 64, "In words, the previous" should read -- In other words, the previous --

Column 27,
Lines 35-36, "the convolution will more modest" should read -- the convolution will be more modest --

Column 28,
Line 28, "sonar to name few." should read -- "sonar to name a few. --

Column 38,
Line 57, "claim 52, are encoded," should read -- claim 52 are encoded, --

Column 39,
Line 26, "variables of integration." should read -- variable of integration. --

Column 40,
Line 56, "claim 61, are encoded," should read -- claim 61 are encoded, --

Column 43,
Lines 10-11, "transformed migration migration operator," should read
-- transformed migration operator, --

UNITED STATES PATENT AND TRADEMARK OFFICE
CERTIFICATE OF CORRECTION

PATENT NO. : 6,049,759
DATED : April 11, 2000
INVENTOR(S) : John T. Etgen

It is certified that error appears in the above-identified patent and that said Letters Patent is hereby corrected as shown below:

Column 9,
Lines 47-48, $$m(x,y,z) = \int_{\omega_{min}}^{\omega_{max}} \int_{x_{min}}^{x_{max}} \int_{y_{min}}^{y_{max}} dy' \, Amp(x', y', z, \omega, x, y)[\exp(i\Phi(x', y', z, \omega, x, y))]d(x', y', \omega)$$

should read:

$$m(x,y,z) = \int_{\omega_{min}}^{\omega_{max}} d\omega \int_{x_{min}}^{x_{max}} dx' \int_{y_{min}}^{y_{max}} dy' \, Amp(x',y',z,\omega,x,y)\,[\exp(i\Phi(x',y',z,\omega,x,y))]\,d(x',y',\omega)$$

Column 10,
Line 49,

"$(X,y,z,X_{R'},Y_{R'})$,"

should read:

"$(X,y,z,X_{R'},y_{R'})$,"

Column 11,
Lines 1-11, $$m(x,y,z) = \frac{1}{8\pi^3} \int_{x_{min}}^{x_{max}} \int_{y_{min}}^{y_{max}} dx'dy' \frac{1}{A(x-x'_s, y-y'_s, z)A(x-x'_R, y-y'_R, z)} \times$$
$$\frac{|H(x-x', y-y', z)|}{|\nabla t(x-x'_s, y-y'_s, z) + \nabla t(x-x'_R, y-y'_R, z)|^2} \times$$
$$\int_{\omega_{min}}^{\omega_{max}} d\omega \Theta(\omega)\exp[-i\omega(t(x-x'_s, y-y'_s, z) + t(x-x'_R, y-y'_R, z))]d(x',y',\omega)$$

should read:

$$m(x,y,z) = \frac{1}{8\pi^3} \int_{x_{min}}^{x_{max}} \int_{y_{min}}^{y_{max}} dx'dy' \frac{1}{A(x-x'_s, y-y'_s, z)\,A(x-x'_R, y-y'_R, z)} \times$$
$$\frac{|H(x-x', y-y', z)|}{|\nabla t(x-x'_s, y-y'_s, z) + \nabla t(x-x'_R, y-y'_R, z)|^2} \times$$
$$\int_{\omega_{min}}^{\omega_{max}} d\omega\, i\omega\, \Theta(\omega)\exp[-i\omega(t(x-x'_s, y-y'_s, z) + t(x-x'_R, y-y'_R, z))]\,d(x',y',\omega)$$

UNITED STATES PATENT AND TRADEMARK OFFICE
CERTIFICATE OF CORRECTION

PATENT NO. : 6,049,759
DATED : April 11, 2000
INVENTOR(S) : John T. Etgen

It is certified that error appears in the above-identified patent and that said Letters Patent is hereby corrected as shown below:

Column 12,
Line 60, $$M_{CO}(k_X, k_Y, z) = \int_{\omega_{min}}^{\omega_{max}} d\omega\, G(k_X, k_Y, z, \omega, h_X, h_Y)\, d_{CO}(x', y', \omega).$$

should read:

$$M_{CO}(k_X, k_Y, z) = \int_{\omega_{min}}^{\omega_{max}} d\omega\, G(k_X, k_Y, z, \omega, h_X, h_Y)\, D_{CO}(k_X, k_Y, \omega)$$

Column 22,
Lines 32-33, $$\frac{\partial t}{\partial x} = \frac{\partial t}{\partial r}\frac{\partial r}{\partial x} = \frac{\partial t}{\partial x}\frac{\partial}{\partial x}\{(\sqrt{x^2+y^2})\} = \frac{\partial t}{\partial r}\frac{x}{\sqrt{x^2+y^2}}.$$

should read:

$$\frac{\partial t}{\partial x} = \frac{\partial t}{\partial r}\frac{\partial r}{\partial x} = \frac{\partial t}{\partial r}\frac{\partial}{\partial x}\{(\sqrt{x^2+y^2})\} = \frac{\partial t}{\partial r}\frac{x}{\sqrt{x^2+y^2}}.\ ($$

UNITED STATES PATENT AND TRADEMARK OFFICE
CERTIFICATE OF CORRECTION

PATENT NO. : 6,049,759
DATED : April 11, 2000
INVENTOR(S) : John T. Etgen

It is certified that error appears in the above-identified patent and that said Letters Patent is hereby corrected as shown below:

Column 23,
Lines 4-5, $$g_{n,m}[i, j, k] = \left( \frac{i\omega_n \Theta(\omega_n)}{8\pi^3} \exp[-i\omega_n(t_S + t_R)] \right) \frac{1}{A_S A_R} \cdot \frac{|H(x_P, X_C, y_P - Y_C, z)|}{|\nabla t_S + \nabla t_R|^2}$$

should read:

$$g_{n,m}[i,j,k] = \left( \frac{i\omega_n \Theta(\omega_n)}{8\pi^3} \exp[-i\omega_n(t_S + t_R)] \right) \frac{1}{A_S A_R} \frac{|H(x_P, X_C, y_P - Y_C, z)|}{|\nabla t_S + \nabla t_R|^2}$$

Signed and Sealed this

Twenty-seventh Day of November, 2001

Attest:

*Nicholas P. Godici*

NICHOLAS P. GODICI
*Attesting Officer*    *Acting Director of the United States Patent and Trademark Office*